United States Patent
Yi et al.

(10) Patent No.: US 10,841,060 B2
(45) Date of Patent: Nov. 17, 2020

(54) METHOD AND APPARATUS FOR CONFIGURING RESOURCE BLOCK STRUCTURE FOR NR IN WIRELESS COMMUNICATION SYSTEM

(71) Applicant: LG ELECTRONICS INC., Seoul (KR)

(72) Inventors: Yunjung Yi, Seoul (KR); Byounghoon Kim, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/330,072

(22) PCT Filed: Sep. 6, 2017

(86) PCT No.: PCT/KR2017/009757
§ 371 (c)(1),
(2) Date: Mar. 1, 2019

(87) PCT Pub. No.: WO2018/048187
PCT Pub. Date: Mar. 15, 2018

(65) Prior Publication Data
US 2019/0229867 A1    Jul. 25, 2019

Related U.S. Application Data

(60) Provisional application No. 62/534,220, filed on Jul. 19, 2017, provisional application No. 62/485,864, (Continued)

(51) Int. Cl.
*H04L 5/00* (2006.01)
*H04W 56/00* (2009.01)

(52) U.S. Cl.
CPC .......... *H04L 5/0048* (2013.01); *H04L 5/0053* (2013.01); *H04W 56/0005* (2013.01)

(58) Field of Classification Search
CPC ....... H04L 5/0048; H04L 5/0053; H04L 5/00; H04W 56/0005; H04W 56/00
See application file for complete search history.

(56) References Cited

U.S. PATENT DOCUMENTS

2012/0069764 A1    3/2012    Classon et al.
2012/0207067 A1    8/2012    Malladi et al.
(Continued)

FOREIGN PATENT DOCUMENTS

EP    3016466    5/2016

OTHER PUBLICATIONS

PCT International Application No. PCT/KR2017/009757, International Search Report dated Dec. 14, 2017, 2 pages.

*Primary Examiner* — Kyaw Z Soe
(74) *Attorney, Agent, or Firm* — Lee, Hong, Degerman, Kang & Waimey

(57) ABSTRACT

A method and apparatus for forming a resource block (RB) structure in a wireless communication system is provided. A user equipment (UE) receives a downlink (DL) signal via first physical resource blocks (PRBs), which are indexed by a network from a center of a band or from a center of a carrier, from the network. And, the UE transmits an uplink (UL) signal via second PRBs, which are aligned with the first PRBs according to synchronization signal (SS) blocks, to the network. Accordingly, a global PRB indexing and a local PRB indexing can be aligned with each other.

12 Claims, 30 Drawing Sheets

Related U.S. Application Data filed on Apr. 14, 2017, provisional application No. 62/482,651, filed on Apr. 6, 2017, provisional application No. 62/460,073, filed on Feb. 16, 2017, provisional application No. 62/459,072, filed on Feb. 15, 2017, provisional application No. 62/459,589, filed on Feb. 15, 2017, provisional application No. 62/457,801, filed on Feb. 10, 2017, provisional application No. 62/438,973, filed on Dec. 23, 2016, provisional application No. 62/401,870, filed on Sep. 29, 2016, provisional application No. 62/383,612, filed on Sep. 6, 2016.

(56) References Cited

U.S. PATENT DOCUMENTS

| | | |
|---|---|---|
| 2014/0064067 A1 | 3/2014 | Drewes et al. |
| 2015/0036609 A1* | 2/2015 | Kim ............... H04L 5/0048 370/329 |
| 2015/0139109 A1* | 5/2015 | Seo ............... H04L 5/0053 370/329 |
| 2015/0245330 A1* | 8/2015 | Sartori ............ H04W 72/042 370/329 |
| 2017/0223686 A1* | 8/2017 | You ............... H04L 5/0048 |
| 2019/0357239 A1* | 11/2019 | Moon ............. H04L 5/0007 |

* cited by examiner

METHOD AND APPARATUS FOR CONFIGURING RESOURCE BLOCK STRUCTURE FOR NR IN WIRELESS COMMUNICATION SYSTEM

CROSS-REFERENCE TO RELATED APPLICATIONS

This application is the National Stage filing under 35 U.S.C. 371 of International Application No. PCT/KR2017/009757, filed on Sep. 6, 2017, which claims the benefit of U.S. Provisional Application Nos. 62/383,612, filed on Sep. 6, 2016, 62/401,870, filed on Sep. 29, 2016, 62/438,973, filed on Dec. 23, 2016, 62/457,801, filed on Feb. 10, 2017, 62/459,589, filed on Feb. 15, 2017, 62/459,072, filed on Feb. 15, 2017, 62/460,073, filed on Feb. 16, 2017, 62/482,651, filed on Apr. 6, 2017, 62/485,864, filed on Apr. 14, 2017, and 62/534,220, filed on Jul. 19, 2017, the contents of which are all hereby incorporated by reference herein in their entirety.

BACKGROUND OF THE INVENTION

Field of the Invention

The present invention relates to wireless communications, and more particularly, to a method and apparatus for configuring a resource block (RB) structure for a new radio access technology (NR) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

SUMMARY OF THE INVENTION

The present invention provides a method and apparatus for configuring a resource block (RB) structure for a new radio access technology (NR) in a wireless communication system. The present invention discusses RB structure and formation in case of mixed numerology used in a NR carrier or bonded carrier.

In an aspect, a method for forming a resource block (RB) structure by a user equipment (UE) in a wireless communication system is provided. The method includes receiving a downlink (DL) signal via first physical resource blocks (PRBs), which are indexed by a network from a center of a band or from a center of a carrier, from the network, and transmitting an uplink (UL) signal via second PRBs, which are aligned with the first PRBs according to synchronization signal (SS) blocks, to the network.

In another aspect, a user equipment (UE) in a wireless communication system is provided. The UE includes a memory, a transceiver, and a processor, coupled to the memory and the transceiver, that controls the transceiver to receive a downlink (DL) signal via first physical resource blocks (PRBs), which are indexed by a network from a center of a band or from a center of a carrier, from the network, and controls the transceiver to transmit an uplink (UL) signal via second PRBs, which are aligned with the first PRBs according to synchronization signal (SS) blocks, to the network.

Resource blocks for different numerologies in a NR carrier can be configured efficiently.

DESCRIPTION OF EXEMPLARY EMBODIMENTS

Figure 1:
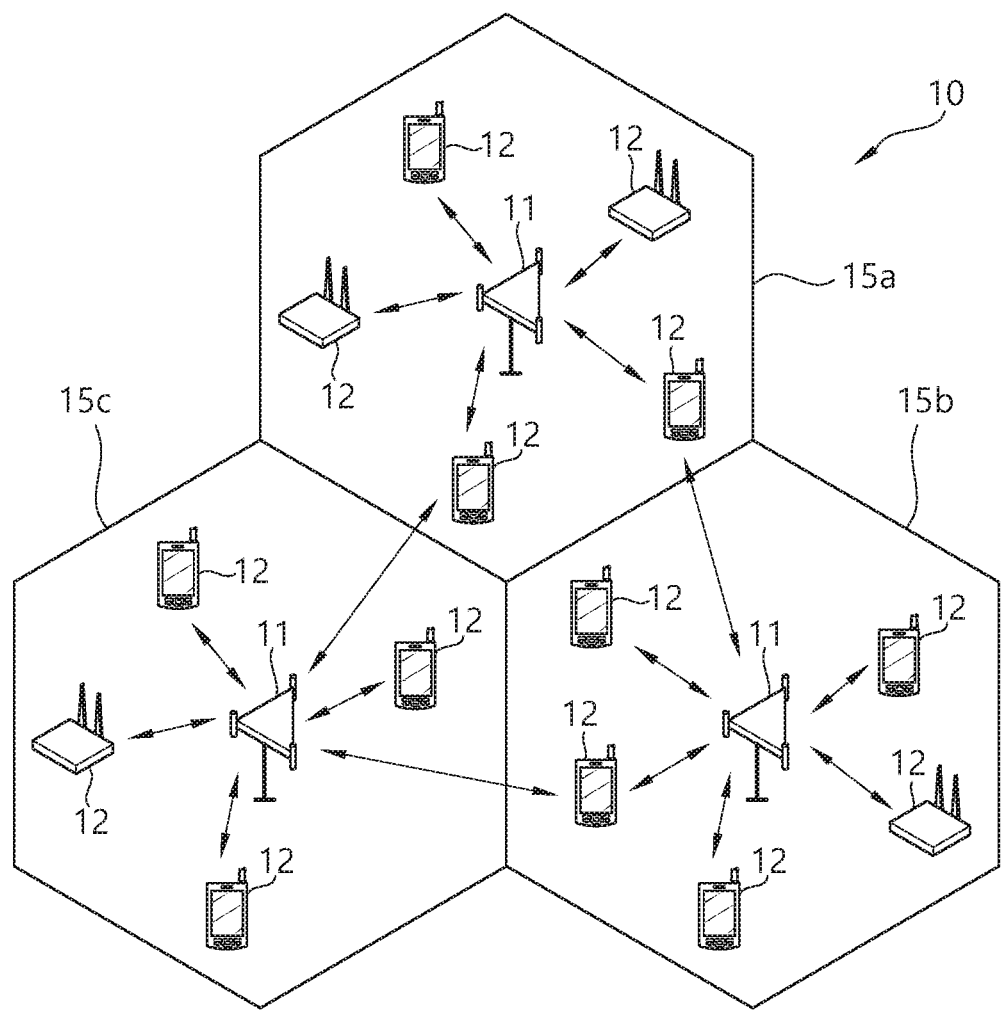
FIG. 1 shows a 3GPP LTE system.

FIG. 1 shows a 3GPP LTE system. The 3rd generation partnership project (3GPP) long-term evolution (LTE) system 10 includes at least one eNodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
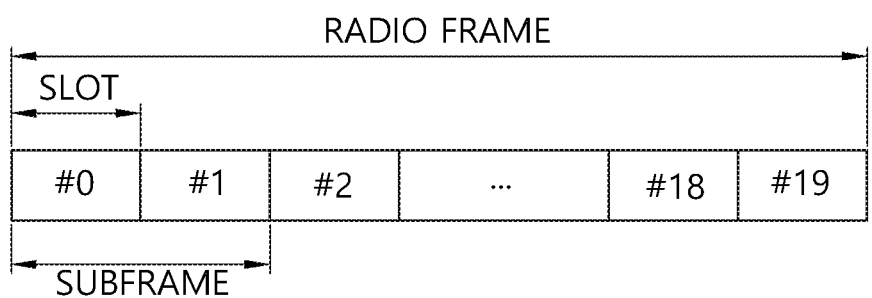
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
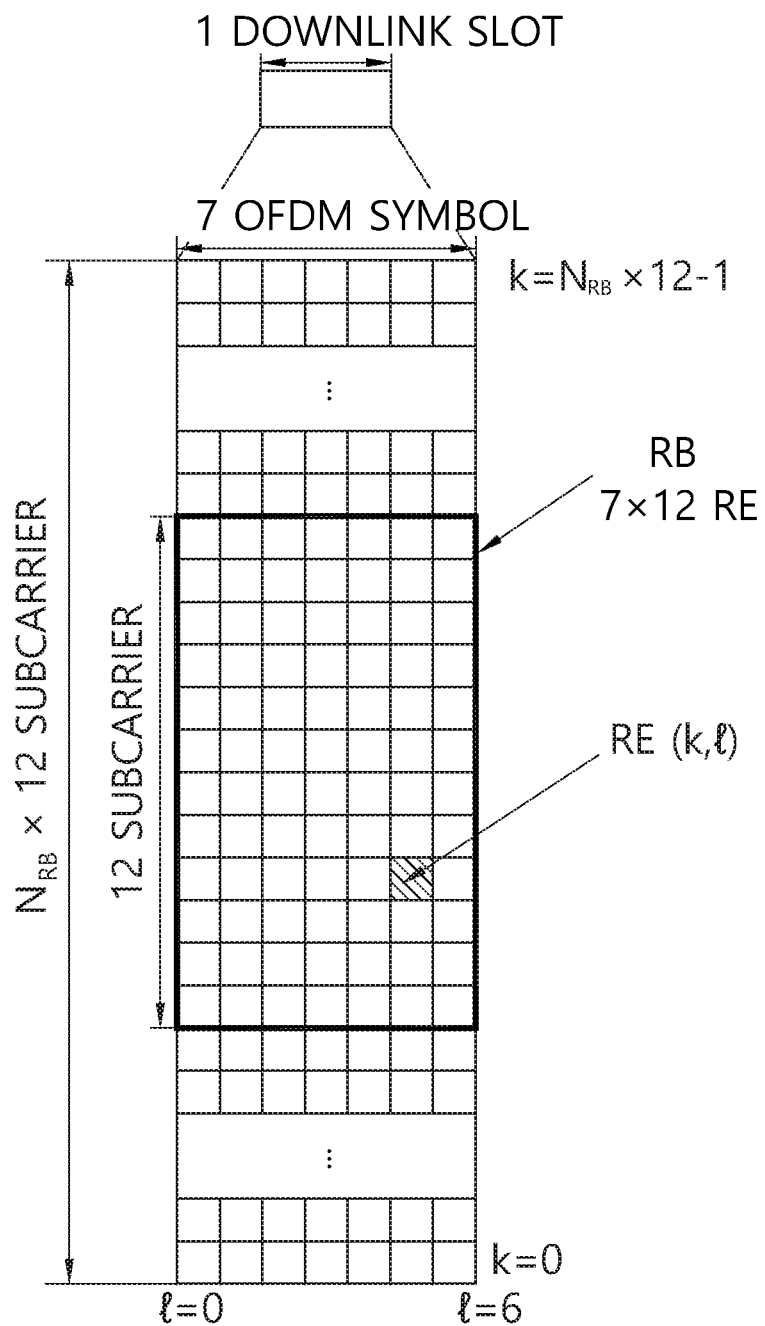
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data (2) Subframes including DL control, DL data, and UL control (3) Subframes including DL control and UL data (4) Subframes including DL control, UL data, and UL control (5) Subframes including access signals or random access signals or other purposes.

(6) Subframes including both DL/UL and all UL signals.

However, the subframe types listed above are only exemplary, and other subframe types may also be considered.

Figure 4:
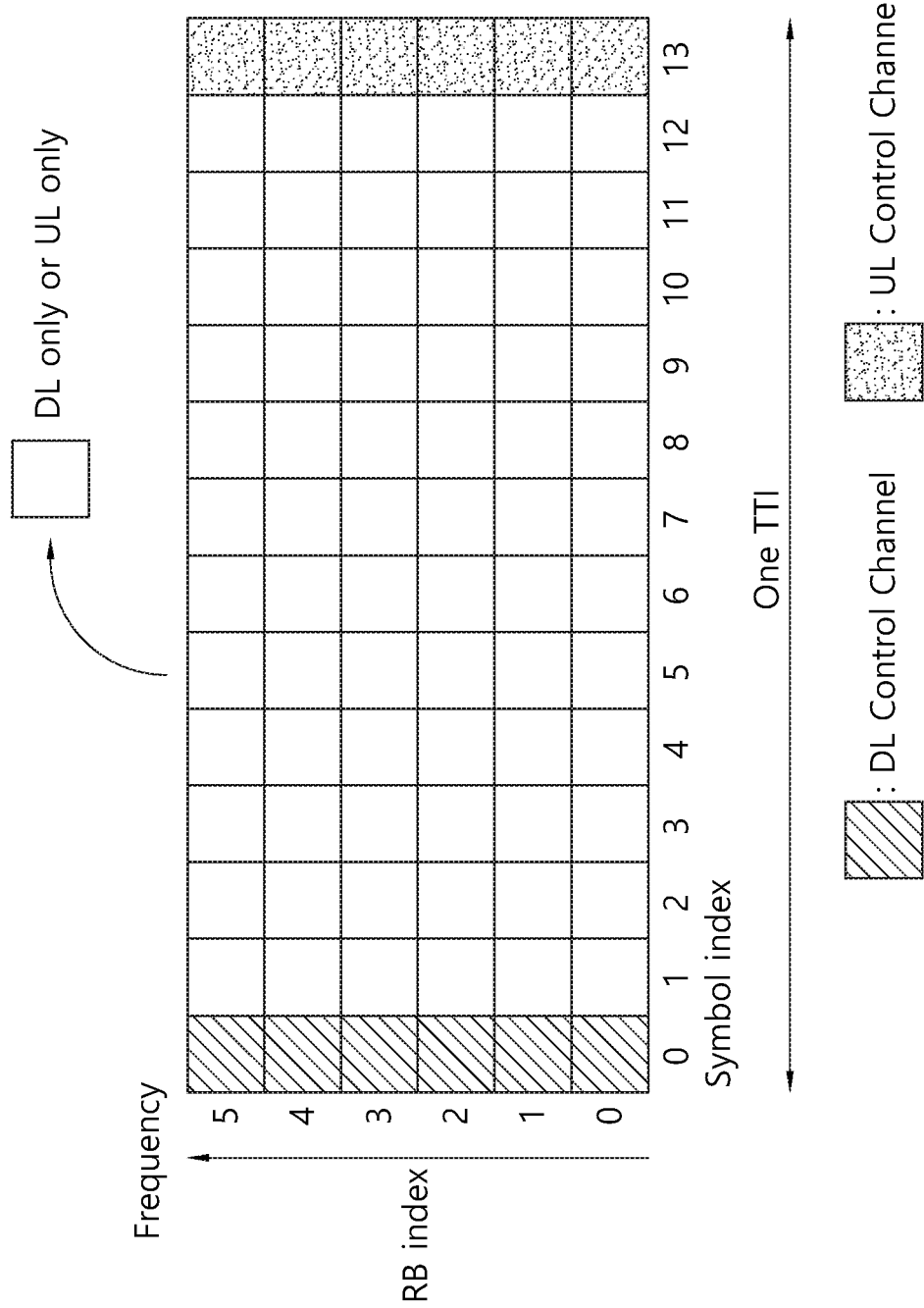
FIG. 4 shows an example of subframe type for NR.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

Different numerologies may be aligned at symbol level or slot/subframe level. In normal CP, symbol level alignment may be achieved by various options. In the description below, for $F_s=F_0*2^n$ (n is a positive integer, $F_0=15$ kHz), each symbol length (including CP) of $F_0$ equals the sum of the corresponding $2^n$ symbols of $F_s$.

Figure 5:
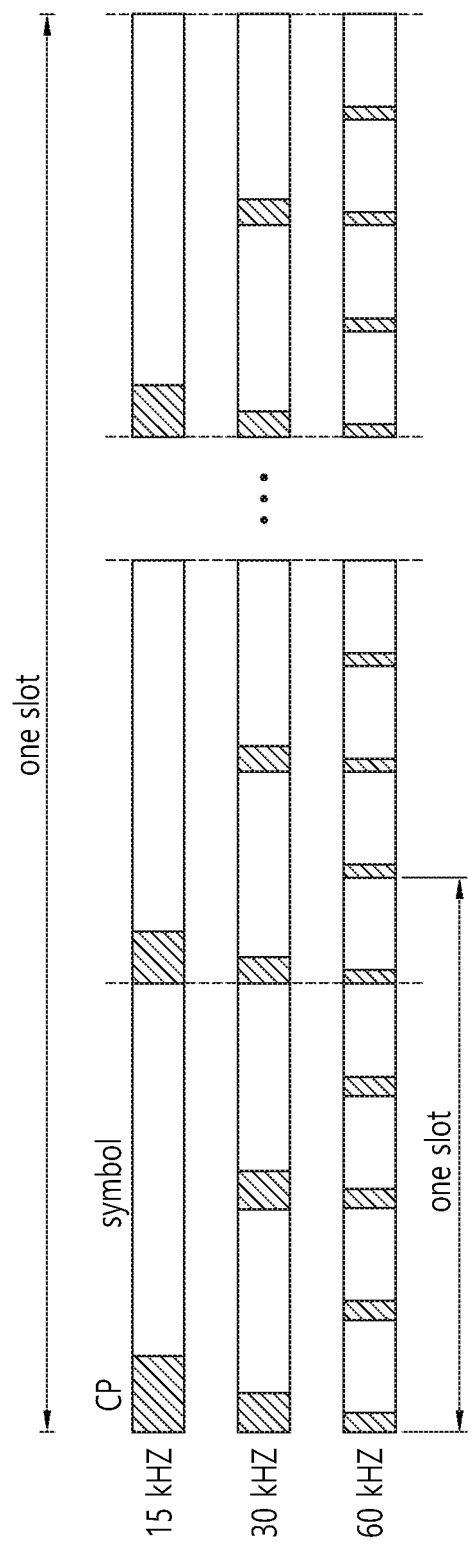
FIG. 5 shows an example of symbol level alignment between different numerologies.

FIG. 5 shows an example of symbol level alignment between different numerologies. Referring to FIG. 5, the first $2^n$ symbols of $F_s$ have equal symbol length.

Figure 6:
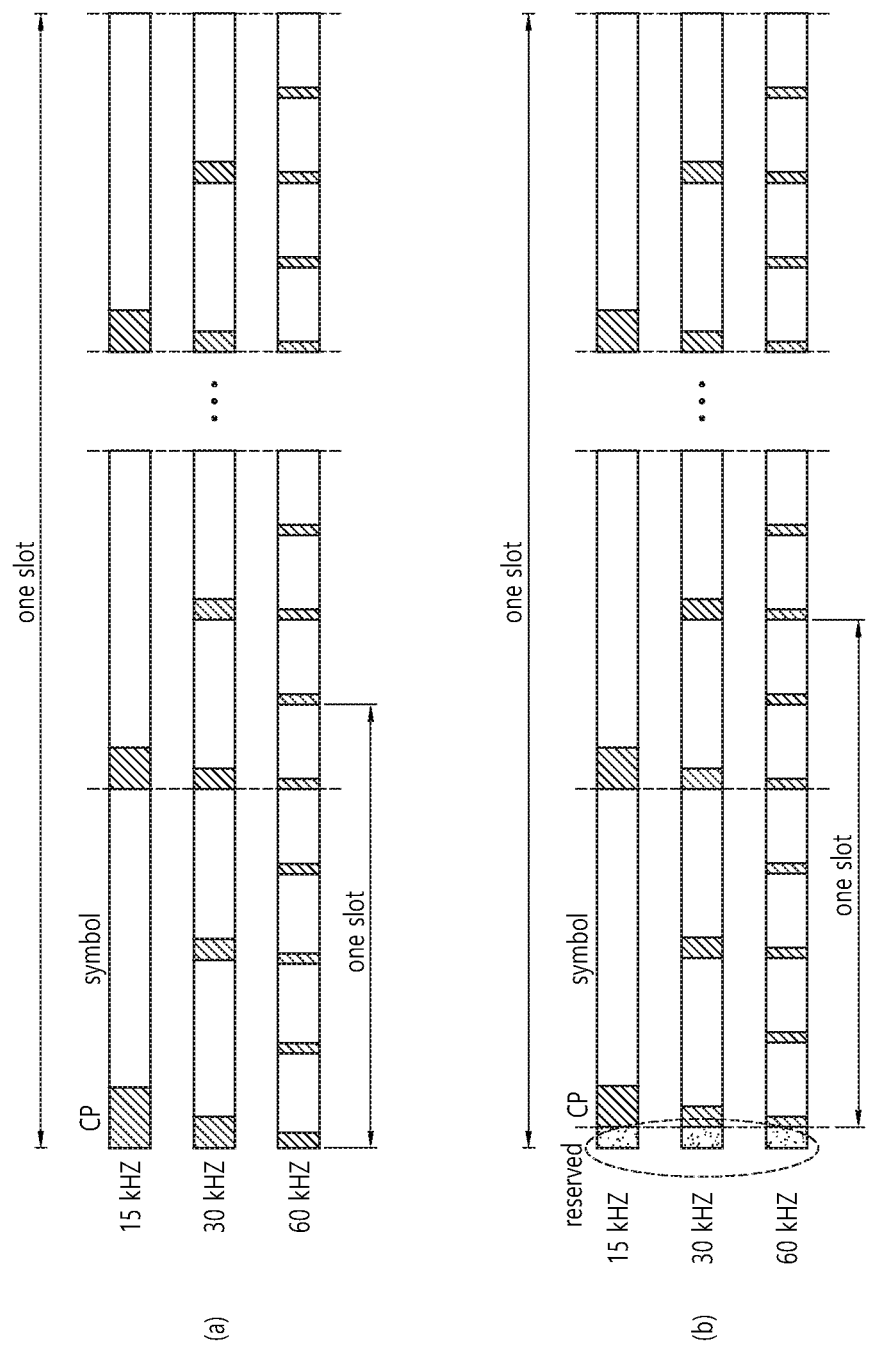
FIG. 6 shows another example of symbol level alignment between different numerologies.

FIG. 6 shows another example of symbol level alignment between different numerologies. Referring to FIG. 6-(a), except for the first symbol of $F_s$, all symbols of $F_s$ have equal symbol length. The length of first symbol of $F_s$ is sum of length of the second symbol and 0.51 us. Referring to FIG. 6-(b), 0.51 us is reserved, and all symbols have the equal length.

Figure 7:
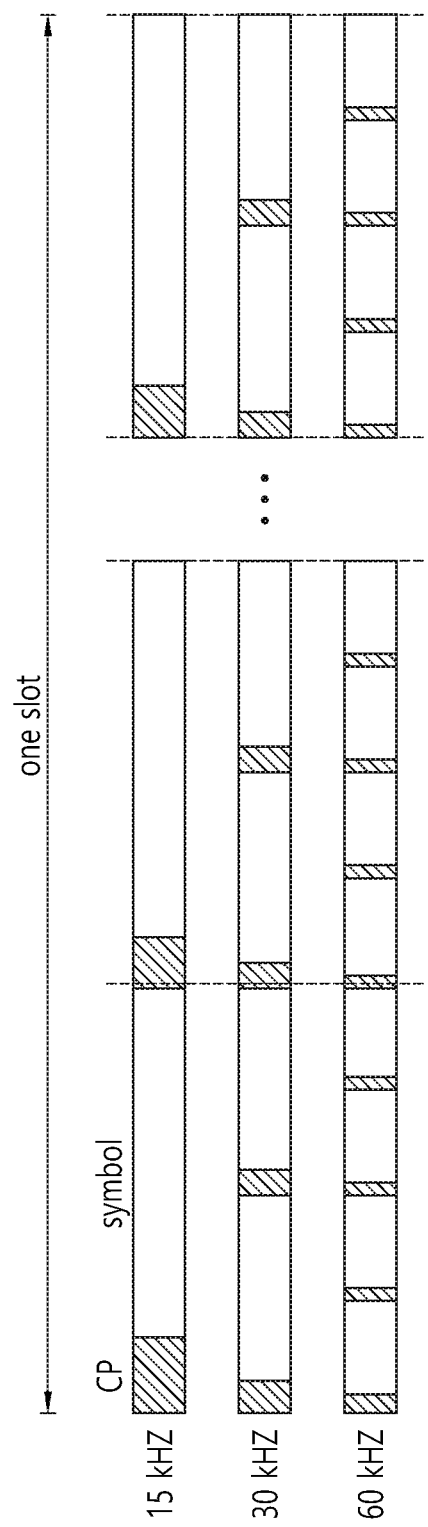
FIG. 7 shows an example of slot/subframe level alignment between different numerologies.

FIG. 7 shows an example of slot/subframe level alignment between different numerologies. Referring to FIG. 7, different numerologies are aligned at slot/subframe level, instead of symbol level alignment.

A carrier is defined with reference numerology, which may be used for synchronization purpose at least. The reference numerology may be fixed as 15 kHz subcarrier spacing with normal CP (NCP) or extended CP (ECP). Or, the reference numerology may be configured by synchronization signal or higher layer. Or, the reference numerology may be determined by the smallest subcarrier spacing supported by the carrier or by the specification. Or, the reference numerology may be may be determined by the largest subcarrier spacing supported by the carrier or by the specification.

In next generation network, it is expected that various usage scenarios requiring different latency and reliability key performance indicator (KPIs) are supported in the same frequency region, potentially by the same cell. Furthermore, to allow growing vertical industry and potentials needs in the future, frame structure should be able to support very flexible resource utilizations. One of flexible resource utilization may include supporting various set of CP overhead compared to (OFDM) symbol size. Some requirements may be listed as follows.

- Resource unit (e.g. subframe) may include variable number of mini-resource units. Different latency requiring usage scenarios may be multiplexed, and thus, ability to allow different resource unit sizes seems necessary. When mini-resource unit is used, basic functions to generate channels may be based on mini-resource unit, rather than resource unit. Basic function may include functionalities such as control/data scrambling, reference signal (RS), scheduling, etc. The mini-resource unit may also be used for inter-cell interference coordination (ICIC). The mini-resource unit size or resource unit size may be different per UE or usage scenario or per subband/narrowband.
- Scheduling unit or resource block used in one transmission may vary depending on latency requirement and packet size, etc. Also, the timing relationship among channels (such as physical downlink shared channel (PDSCH) and corresponding acknowledgement/non-acknowledgement (ACK/NACK), UL grant to physical uplink shared channel (PUSCH), semi-persistent scheduling (SPS) configuration periodicity, etc.) may be different per UE or usage scenario or/subband/narrowband.
- Mechanism to maximize spectral efficiency, e.g. by reducing CP or guard period (GP), may be supported. For one of extreme mechanism, multiple set of (CP size, symbol size) may be transmitted. Then, a UE may select the best pair based on the measurement, and report it back to the network, so that the selected pair can be used for the given UEs. For example, under 6 GHz frequency, there may be {NCP, 15 kHz}, {ECP, 30 kHz}, {NCP, 30 kHz}, {NCP, 60 kHz} possibilities which may be sent via measurement RS or signals, so that that a UE can measure the performance and report the best pair. This may also be done via initial access procedure (e.g. random access response (RAR) or Msg 4 may be sent with multiple combinations and the UE may select the best pair based on received RAR or Msg 4 quality). Regarding GP, the network may assume "no GP" for a given UE initially, and set GP based on UE capability or requesting GP length. The UE may ask margin, in addition to timing advance on GP requirement which may be necessary for transient period or DL/UL switching. As timing advance may also be increased, GP length may be dynamically adjusted via higher layer signaling or may be changed autonomously with timing advance.
- Network may be able to blank partial or full resource unit in both time and frequency domain. For example, very short and infrequent message interruption may be necessary to convey emergency messages or extremely urgent message delivery. The special symbol may be used for blank resource for future proof.
- Basic mechanism of assuming that one resource unit defined in a time duration may be always usable by the network either to DL or UL may not work. It should be supported to provide reserved partial resources which may not be used for some UE's DL/UL, even in one resource unit.
- Different UEs may be multiplexed, and different UEs may require different CP length due to its environments.

Based on the above observations/requirements, the present invention pro poses flexible resource unit definition. For the flexible resource unit definition, the followings may be considered.

(1) Different number of symbols in a resource unit may be allowed. Effective FDM symbols usable for DL or UL or sidelink (SL) may be restricted. Various pattern of special resource or reserved resource may be configurable. The special resource may mean that the resource may not be used for regular TTI definition, rather it may be used for some other purposes, such as control and/or pilot RS transmission.

(2) Size of resource unit may change over time and frequency, and different sizes of resource units may be multiplexed by frequency division multiplexing (FDM) and/or time division multiplexing (TDM) manner from the network perspective. If the network and/or UE supports, different sizes of resource units of different sizes may also be overlapped with each other.

(3) For a convenience, there may be two aspects to define resource units in frequency domain and time domain. From frequency domain, a set of contiguous subcarriers which utilizes the same numerology may be called frequency resource group (FRG). From time-domain, a set of symbols which utilizes the same numerology may be called time resource group (TRG). A numerology resource group (NRG) is defined as a set of FRG and TRG, with a numerology set (i.e. {subcarrier spacing, CP duration(s)}). The present invention mainly discusses TRG construction, which may be applied to a NRG. FRG may be contiguous or non-contiguous. In case contiguous FRG, there may be multiple FRGs sharing the same numerology in a NR carrier. In case non-contiguous FRG, only one FRG in a NR carrier uses the same numerology.

If TRG is defined, there may be multiple of TRGs using the same numerology, which may be called group-TRG (G-TRG). G-TRG may be larger than 1 ms or subframe length of a given numerology or a reference numerology. In any case, from a UE perspective, for a given usage scenario and a given NRG, the UE may assume that the same numerology is used in the NRG. This may also be used for ICIC. For example, the network may change its numerology at subframe or a time scale of G-TRG which may be either prefixed or configured (which may also be coordinated among inter cells). Coordination with LTE numerology may be allowed and at least the same numerology may be used within 1 ms or the numerology may change at time-scale of T (i.e. G-TRG size) to avoid unnecessarily fluctuating interference. In other words, this time and frequency units may be negotiated/coordinated among neighbour cells so that each cell can manage its own scheduling/handling of interference accordingly. If there are multiple NRGs, multiple signaling of time and frequency granularity with numerology set may be coordinated.

From a UE cancellation perspective, the duration where one numerology can be maintained in a time T regardless of whether the service is intended for the UE or not may also be known to the UE that. During the time, a UE may assume the signals may be generated based on the configured numerology. However, this may be only used as baseline signaling, and some other numerology based generated signals may puncture the baseline signals. For example, a network may configure a frequency range with 15 kHz and normal CP for a radio frame unit, and then 30 kHz URLLC traffic may puncture the baseline 15 kHz signals occasionally.

G-TRG may also be used for signaling purpose, and a UE may be configured dynamically with a numerology set which will be used in the next G-TRG/FRG. Time and/or frequency RG indication may be possible.

So, at least from ICIC perspective or UE cancellation perspective, basic unit to retain the same numerology may be necessary in addition to the frequency information. However, multiple levels of G-TRGs may be defined with the same numerology set in the same frequency region or FRG, so that one may be semi-statically configured, which may be dynamically overridden by dynamic change. For example, semi-statically, G-TRG may be configured in multiple of radio-frames, which may be overridden by dynamic signaling per each subframe. For example, G-TRG may be a radio frame and TRG may be a subframe. For UL and DL, G-TRG and TRG may be independently configured from a numerology perspective.

In general, to operate in unpaired spectrum, the followings may be considered.

Semi-static UL/DL configuration may be given per subframe

TRG in unit of subframe per DL and UL may be configured

G-TRG in unit of TRG per DL and UL may be configured

Group-FRG (G-FRG) per each numerology may be configured (baseline FRG or a carrier)

Dynamic frequency region change indication may be used with each numerology

Hereinafter, a resource block (RB) structure for a NR is described according to the present invention. In NR, flexible utilization system bandwidth may be considered. When a chunk of spectrum is allocated to an operator or a set of operators, the chunk of spectrum may be called a band. A band can be utilized as follows.

(1) A band may be partitioned into a few NR carrier, and each NR carrier may have maximum system bandwidth.

(2) A band may be used for one or more NR carriers, and the number of NR carriers operating in the same band may change semi-statically or dynamically.

(3) A band may be partitioned into a few channel Each channel may have the same bandwidth. A NR carrier may consist of one or multiple of channels.

(4) A band may be partitioned into a few NR carrier, and bandwidth of each NR carrier may change semi-statically or dynamically.

For different options of NR carrier in a frequency band, the present invention discusses mechanisms to form PRBs. The PRBs may be mapped to logical RBs, which may be used for control/data scheduling.

Figure 8:
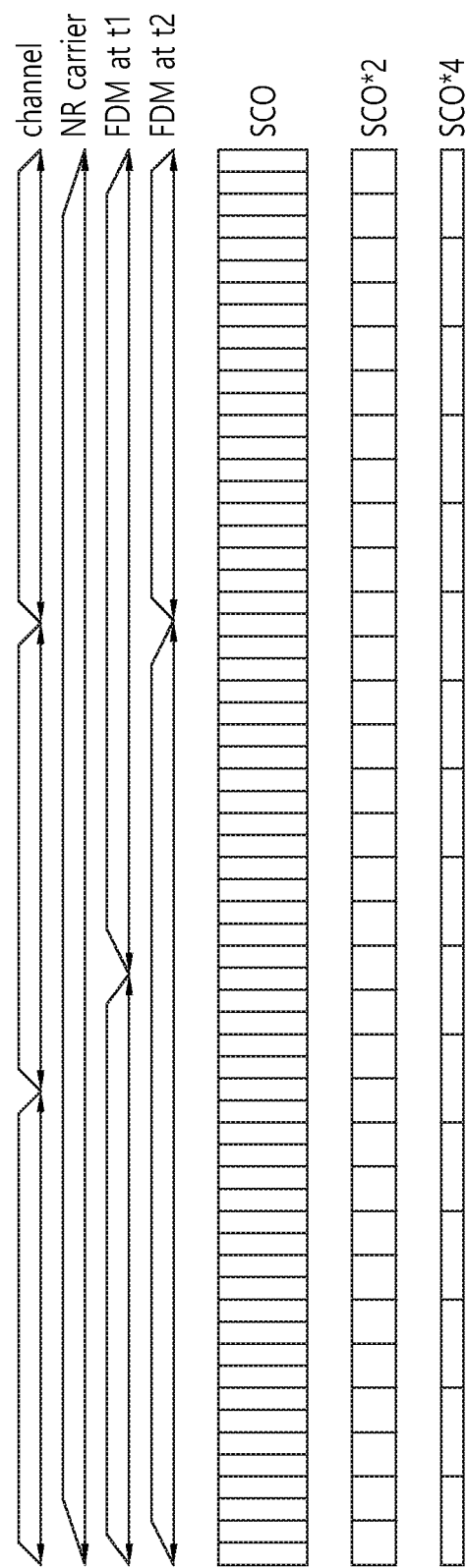
FIG. 8 shows an example of NR carrier and channels in a frequency band according to an embodiment of the present invention.

FIG. 8 shows an example of NR carrier and channels in a frequency band according to an embodiment of the present invention. Referring to FIG. 8, different channels/NR carriers may be configured in a frequency band. Further, different numerologies may be multiplexed by FDM, and the bandwidth of each numerology may change in different time dynamically or semi-statically.

A NR carrier may consist of one or more channels, and the channel may be defined as minimum unit size where aggregation or bonding may work or FDM of different numerology may be performed. Regarding the channel, the following options may be considered.

(1) Channel may be defined as the minimum system bandwidth that the network supports. For example, a channel bandwidth may be approximately 10 MHz or 20 MHz.

(2) Channel may be defined as the minimum RB that the network intends to support in the frequency spectrum based on the largest subcarrier spacing that the network may support. For example, if the maximum subcarrier spacing is 480 kHz, then the RB size may be 1 RB, which may correspond to 480*12 or 480*16 (5760 kHz or 7680 kHz).

(3) Channel may be defined as the minimum RB of K RB based on a reference numerology. For example, reference numerology may be 15 kHz subcarrier spacing, and K may be 24 or 16. Or, considering possible guard band, K MAY be 26 or 18 (counting 1 RB in each side).

Regarding the RB formation, the following options may be considered.

(1) Approach 1: Per Band

RB may be defined per frequency band for each numerology (more specifically, for each subcarrier spacing). There may be no guard band between channels and/or between carriers and/or between FDM subbands. This mechanism is shown in FIG. 8. If this approach is used, PRB may be defined even in guard band, and RB(s) which fall into guard band(s) may not be used for any data/control scheduling. Alternatively, guard band with this approach may not be accounted for RB formation. In this case, the fixed or semi-fixed guard band in a frequency band may be assumed.

(2) Approach 2: Per Carrier

RB may be defined per carrier for each numerology (more specifically, for each subcarrier spacing). Guard band may also be accounted for RB formation. That is, RB may be defined across the entire system bandwidth including guard band. Alternatively, guard band may not be accounted for RB formation. That is, RB may be defined only across the entire available system bandwidth without semi-fixed guard band. The guard band necessary for dynamic operation or semi-static FDM between different numerologies may be accounted for RB formation.

(3) Approach 3: Per Channel

RB may be defined per channel for each numerology (more specifically, for each subcarrier spacing). Similar to Approach 2, guard band may also be accounted for RB formation, or may not be accounted for RB formation.

(4) Approach 4: Within a Frequency Region Indicated by Starting and Ending Position RB may be defined within a frequency region, and the starting and ending frequency position of RB may be indicated implicitly or explicitly by the network. One example may be to configure system bandwidth with starting frequency position, and another example may be to configure frequency region to apply FDM multiplexing among different numerologies. For each numerology, different starting/ending frequency position may be configured. For this approach, guard band may or may not be accounted for RB formation. Starting/ending frequency position for a numerology may be dynamically indicated or semi-statically indicated. Only starting frequency position may be indicated. Starting frequency position may not be absolute position. Rather, the network may give information on how to form a RB grid within a carrier (when Approach 2 is used with FDM multiplexing among different numerologies).

For each numerology, starting/ending frequency position may be indicated where RB for each numerology is formed. In this case, the RB grid of different numerologies may not be nested each other, as different starting/ending frequency position may be indicated.

Or, RB may be formed based on a reference or base numerology. Reference numerology refers the numerology used in synchronization signal(s), and base numerology refers the numerology used for physical broadcast channel (PBCH) and/or system information block (SIB) transmission and/or common data transmission. Based on RB formation, with different subcarrier spacing from reference or base numerology's subcarrier spacing, RB may start in any RB boundary based on reference numerology or base numerology. For a subcarrier spacing $SCi=SC0*2^i$ where SC0 refers reference numerology or base numerology, $2^i$ candidate frequency position to start RB grid for SCi may exist. The candidate frequency position may be dynamically or semi-statically indicated.

When dynamic FDM between different numerologies are used, it is desirable to indicate RB grid of a subcarrier spacing, which is not the reference numerology or base numerology, dynamically via, e.g. downlink control information (DCI). This is to mainly maximize scheduling efficiency if only a chunk of resource blocks used by the base numerology is emptied, and resource grid of different subcarrier spacing can be shifted to allow efficient packing in frequency domain. When the starting frequency location of two numerologies are the same, this approach may produce nested RB structure. When FDM and TDM are jointly used, RB formation for a numerology may be determined firstly following FDM rule, and if there are further numerology multiplexed within the same frequency region via TDM, as the starting frequency location of two numerologies are the same, the nested RB structure may be considered. Even when TDM only is used, if the starting frequency changes, the RB formation/grid may change. This approach ensures that RB grid of a given numerology is formed from the starting frequency region, which may be implicitly or explicitly indicated. One implicit mechanism may be to assume that frequency region is equal to the entire band or carrier or channel (i.e. Approach 1, 2, 3).

More specifically, starting/ending frequency position may not directly indicate the system bandwidth or bandwidth that a UE can monitor. A UE may be separately configured with starting bandwidth or ending frequency position to monitor which may change dynamically via explicit signaling, frequency hopping, implicit signaling, etc.

If this approach is used with channel bonding, starting/ending frequency position may be signaled dynamically. Alternatively, as mentioned above, RB grid pattern/format may indicate different pattern from the starting frequency position. For example, though channel bonding is used, the RB grid based on reference/base numerology may not change. For other subcarrier spacing, the starting frequency position may not be changed (i.e. some frequency regions may not be scheduled with different numerology other than reference numerology which are affected by channel bonding). Though to reflect changed system bandwidth and efficient multiplexing, it may be considered to shift RB grid.

1. Approach 1: Per Band RB Definition

The RB formation may start by one of the following options.

(1) At the lowest frequency of the band: The remained frequency, which is less than RB bandwidth, may be placed in the highest frequency of the band, which may or may not be mapped to a RB. If it is mapped to the RB, at least one RB may contain less than K subcarriers (K=12 or 16)

(2) At the center frequency of the band: the remained frequency, which is less than RB bandwidth, may be placed in one or both edge of the band (e.g. at the end of highest frequency of the band), which may or may not be mapped to RB(s). If it is mapped to RBs, at least two RBs may contain less than K subcarriers in both ends.

(3) At the highest frequency of the band: The remained frequency, which is less than RB bandwidth, may be placed in the lowest frequency of the band, which may or may not be mapped to a RB. If it is mapped to the RB, at least one RB may contain less than K subcarriers (K=12 or 16).

When this mapping is used, the guard band may be formed aligned with RB boundaries of given numerology or reference numerology.

Figure 9:
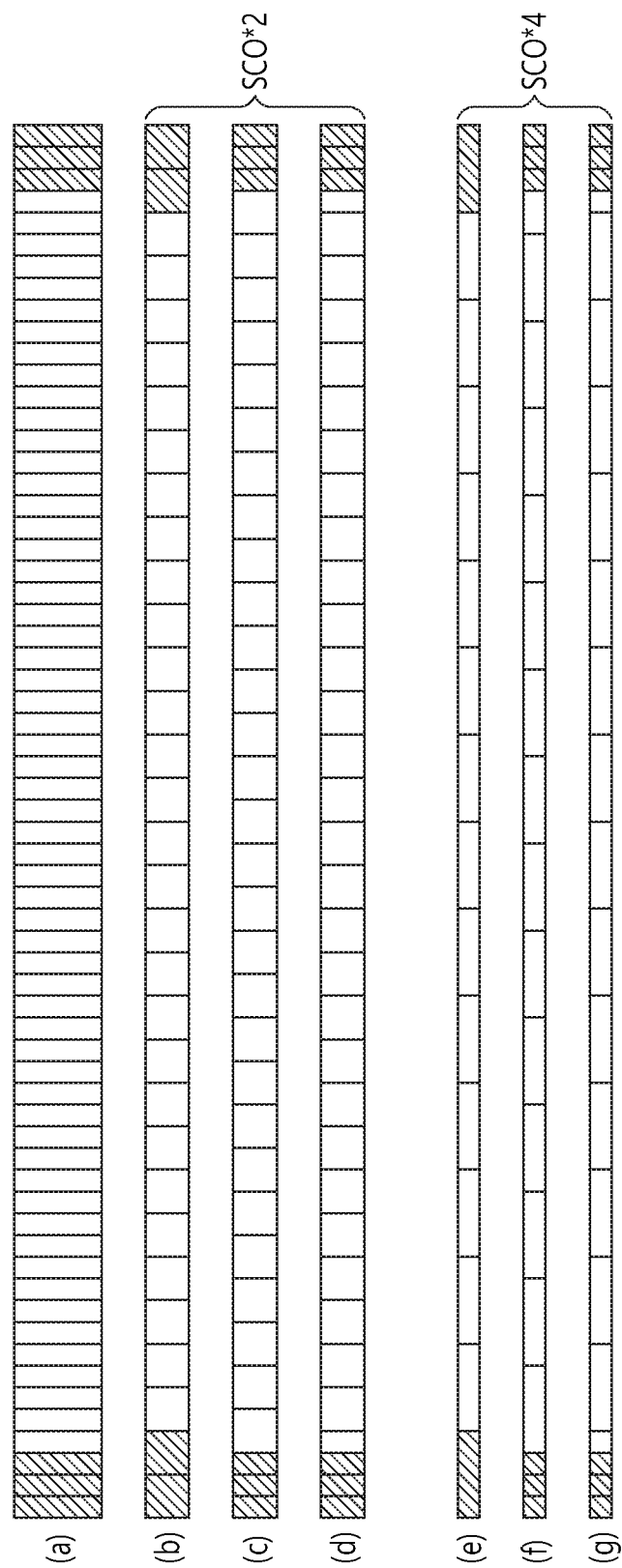
FIG. 9 shows an example of guard band when RBs are defined per band according to an embodiment of the present invention.

FIG. 9 shows an example of guard band when RBs are defined per band according to an embodiment of the present invention. FIG. 9-(a) shows guard band for reference numerology (SC0). FIG. 9-(b) show that guard band is aligned with RB boundary for SC0*2. FIG. 9-(c) show that guard band is aligned with RB boundary of reference numerology & RB floating for SC0*2. FIG. 9-(d) show that guard band is aligned with RB boundary of reference numerology & RB fixed for SC0*2. FIG. 9-(e) show that guard band is aligned with RB boundary for SC0*4. FIG. 9-(f) show that guard band is aligned with RB boundary of reference numerology & RB floating for SC0*4. FIG. 9-(g) show that guard band is aligned with RB boundary of reference numerology & RB fixed for SC0*4.

In a NR carrier, guard band may be defined as M*RB, and RB bandwidth may be determined based on reference numerology or the given numerology which is used for actual transmission. This may be assumed based on DL transmission. If guard band is defined based on the reference numerology, the reference numerology may be the same numerology used for subframe definition. If guard band is defined based on the given numerology, the guard band size may be increased, particularly with larger subcarrier spacing. Thus, guard band may be defined based on the lowest subcarrier spacing or reference numerology where the RB boundary of the given numerology is not affected by the guard band (i.e. FIG. 9-(d) or FIG. 9-(g)). The remaining portion not used for guard band in a RB may be used for data/control transmission, and the guard band portion may be punctured or rate matched in the given RB.

Figure 10:
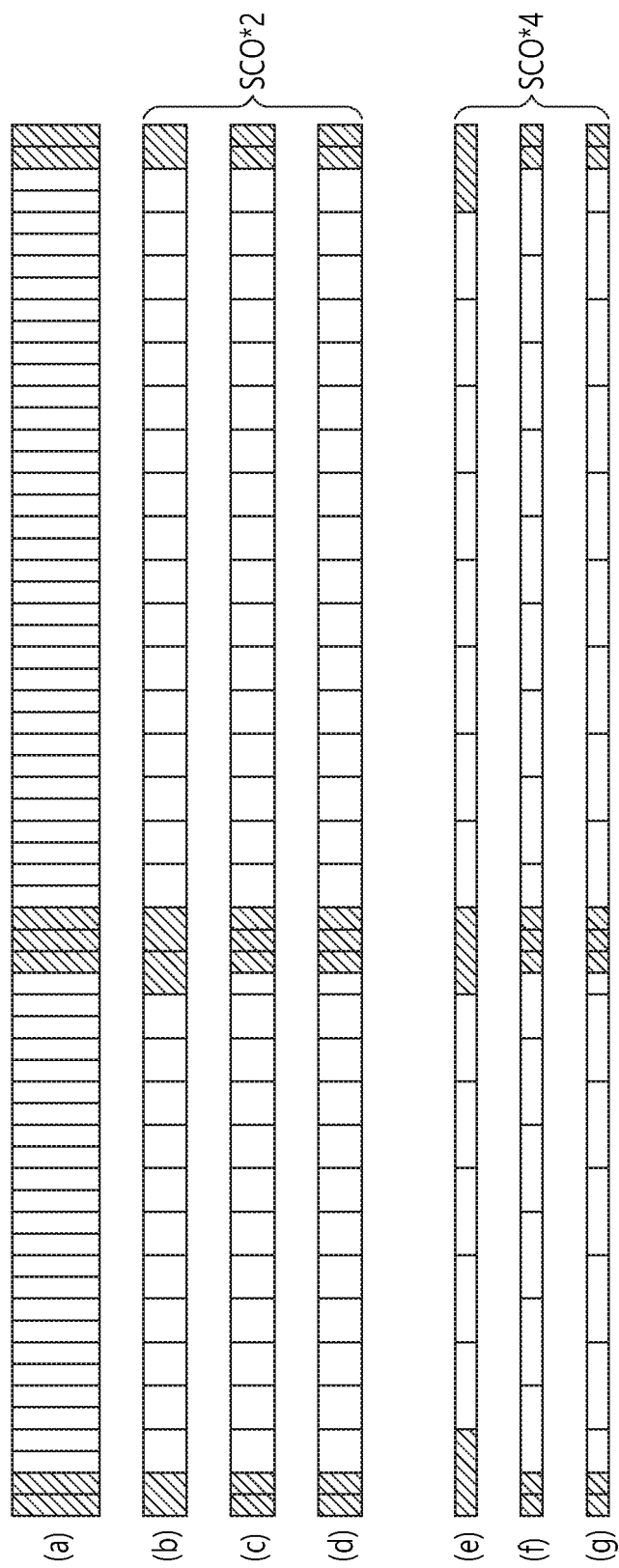
FIG. 10 shows another example of guard band when RBs are defined per band according to an embodiment of the present invention.

FIG. 10 shows another example of guard band when RBs are defined per band according to an embodiment of the present invention. FIG. 10 is similar to FIG. 9, but shows an example in case of FDM, and the necessary guard band between different subbands.

The guard band may be absorbed into either smaller or higher subcarrier spacing RB.

The guard band may be handled by the network scheduling, and the network may not schedule any data/control in the guard band RB(s).

RB may consist of 12 subcarriers. If a band bandwidth is approximately 80 MHz and when guard band is not accounted for RB formation, about 400 RB with 15 kHz subcarrier spacing (200 RB with 30 kHz subcarrier spacing, 100 RB with 60 kHz subcarrier spacing), excluding guard band, may be defined. When guard band is accounted for RB formation, 440 RB with 15 kHz subcarrier spacing (220 RB with 30 kHz subcarrier spacing, 110 RB with 60 kHz subcarrier spacing), including guard band, may be defined.

Alternatively, RB may consist of 16 subcarriers. If a band bandwidth is approximately 80 MHz and when guard band is not accounted for RB formation, about 300 RB with 15 kHz subcarrier spacing (150 RB with 30 kHz subcarrier spacing, 75 RB with 60 kHz subcarrier spacing), excluding guard band, may be defined. When guard band is accounted for RB formation, about 328 or 332 RB with 15 kHz subcarrier spacing (164 RB with 30 kHz subcarrier spacing, 82 RB with 60 kHz subcarrier spacing), including guard band, may be defined.

2. Approach 2: Per Carrier RB Definition

Similar mechanisms described above for Approach 1, i.e. per band RB definition, may be used for per carrier RB definition. Depending on the RB size, different carrier bandwidth may be considered.

RB may consist of 12 subcarriers. If a carrier bandwidth is approximately 20 MHz and when guard band is not accounted for RB formation, about 100 RB with 15 kHz subcarrier spacing (50 RB with 30 kHz subcarrier spacing, 25 RB with 60 kHz subcarrier spacing), excluding guard band, may be defined. When guard band is accounted for RB formation, about 110 RB with 15 kHz subcarrier spacing (55 RB with 30 kHz subcarrier spacing, 27.5 RB with 60 kHz subcarrier spacing), including guard band, may be defined.

If a carrier bandwidth is approximately 20 MHz and channel bonding or efficient aggregation is considered, RB may be defined as follows. When guard band is not accounted for RB formation, about 100 RB with 15 kHz subcarrier spacing (50 RB with 30 kHz subcarrier spacing, 25 RB with 60 kHz subcarrier spacing), excluding guard band, may be defined. When guard band is accounted for RB formation, about 112 RB with 15 kHz subcarrier spacing (56 RB with 30 kHz subcarrier spacing, 28 RB with 60 kHz subcarrier spacing), including guard band, may be defined. In this case, the overall system bandwidth may exceed 20 MHz (i.e. about 20.16 MHz). To address this issue, carrier bandwidth may be defined as N*RB_size (e.g. 20.16 MHz) or 0.16 MHz may be taken from one side to meet 20 MHz. Overall, carrier bandwidth may be represented as N*RB size, and RB size may be determined based on the reference subcarrier spacing or largest subcarrier spacing or smallest subcarrier spacing that the network intends to support in a frequency band.

Alternatively, RB may consist of 16 subcarriers. If a carrier bandwidth is approximately 20 MHz and when guard band is not accounted for RB formation, about 75 RB with 15 kHz subcarrier spacing (37.5 RB with 30 kHz subcarrier spacing, 18.75 RB with 60 kHz subcarrier spacing), excluding guard band, may be defined. When guard band is accounted for RB formation, about 82 or 83 RB with 15 kHz subcarrier spacing (41 RB with 30 kHz subcarrier spacing, 20.5 RB with 60 kHz subcarrier spacing), including guard band, may be defined.

If a carrier bandwidth is approximately 20 MHz and channel bonding or efficient aggregation is considered, RB may be defined as follows. When guard band is not accounted for RB formation, about 75 RB with 15 kHz subcarrier spacing (37.5 RB with 30 kHz subcarrier spacing, 18.75 RB with 60 kHz subcarrier spacing), excluding guard band, may be defined. When guard band is accounted for RB formation, about 84 RB with 15 kHz subcarrier spacing (42 RB with 30 kHz subcarrier spacing, 21 RB with 60 kHz subcarrier spacing), including guard band, may be defined. In this case, the overall system bandwidth may exceed 20 MHz (i.e. about 20.16 MHz). To address this issue, carrier bandwidth may be defined as N*RB_size (e.g. 20.16 MHz) or 0.16 MHz may be taken from one side to meet 20 MHz. Overall, carrier bandwidth may be represented as N*RB size, and RB size may be determined based on the reference subcarrier spacing or largest subcarrier spacing or smallest subcarrier spacing that the network intends to support in a frequency band.

Or, a carrier bandwidth may be defined as 2n*RB, where n is positive integer. For example, a carrier bandwidth may be defined as 64 or 128 RB with 15 kHz subcarrier spacing (32 or 64 RB with 30 kHz subcarrier spacing, 16 or 32 RB with 60 kHz subcarrier spacing) for only effective system bandwidth, excluding or including guard band. When RB is defined per minimum unit, a minimum unit may be defined as 2n*RB, where RB bandwidth is defined based on the reference subcarrier spacing or largest subcarrier spacing or smallest subcarrier spacing. When determining RB bandwidth used may be derived from synchronization signal, or configured by higher layer signaling.

If system bandwidth including guard band of a carrier is not multiple of RB based on a reference carrier, the remainder may be placed in either or both edge(s) of system bandwidth depending on the RB construction mechanism.

Similar mechanisms may be applied to RB construction in each channel, and channel bandwidth may be generally smaller than carrier bandwidth.

3. Details of Per Carrier RB Definition (1): RB Grid Starts from the Center (1) Option 1: DC subcarrier may always be at the edge of a PRB. If half-subcarrier shift is not used, DC subcarrier may be the first or the last subcarrier of a PRB near the center. If half-subcarrier shift is used, DC subcarrier/subcarrier may be placed in null subcarrier between two PRBs, in terms of center, and it may be left or right shifted of half PRB from the center. In this case, actual PRBs within RX bandwidth may be larger than the system bandwidth in which the edge PRB may not be used for data transmission.

(2) Option 2: When effective system bandwidth consists of odd PRBs for a given subcarrier spacing, DC subcarrier may be in the middle of a PRB in the center. That is, if half-subcarrier shift is not used, DC subcarrier may be 6th or 7th subcarrier, starting from 1st subcarrier. Though, data may be mapped to the DC subcarrier. Otherwise, DC subcarrier may be placed between 6th and 7th subcarrier of a PRB in the center. When effective system bandwidth consists of even PRBs for a given subcarrier spacing, DC subcarrier may be placed as same as Option 1 described above. Depending on system bandwidth and numerology set, DC subcarrier may be present center or edge of PRB per given numerology. Also, RB grid among different numerologies may not be nested each other to align DC subcarrier.

(3) Option 3: RB grid may be formed based on one of the reference numerology, numerology used for synchronization signals, 15 kHz subcarrier spacing, or numerology used for common signal such as SIB transmission. Then, RB grid of other numerology may be formed from the lowest PRBs of the reference/base numerology in a nested manner DC subcarrier may be placed following Option 1 or 2 described above. To avoid misalignment among different numerologies, it may be desirable to place DC subcarrier at the edge of a PRB (i.e. Option 1).

(4) Option 4: DC subcarrier may be defined by assuming always even number of PRBs in the system bandwidth. In other words, DC subcarrier may be placed at the edge of PRB based on the numerology which is the largest subcarrier spacing supported by the network. More particularly, to place DC subcarrier in the edge of PRBs based on the largest subcarrier spacing, regardless of subcarrier spacing, the (effective) system bandwidth may be defined as follows.

m1 PRBs for the largest subcarrier spacing m1*2 PRBs for the second largest subcarrier spacing, and so on, for other subcarrier spacing m1*k PRBs for the smallest subcarrier spacing, where k=largest subcarrier spacing/smallest subcarrier spacing If the remaining PRBs are left, those may be used based on radio frequency (RF) bandwidth. In other words, some RBs in different side may not be used for data transmission.

With Options 1, 3 or 4, the effective bandwidth that a UE should assume may be larger than actual bandwidth. Accordingly, filtering requirement may be affected. More generally, the RF bandwidth may be defined based on DC subcarrier, and RBs not belonging to the RF bandwidth (data bandwidth) may not be used. Alternatively, smaller RF bandwidth (aligned with the effective RBs) may be used.

Figure 11:
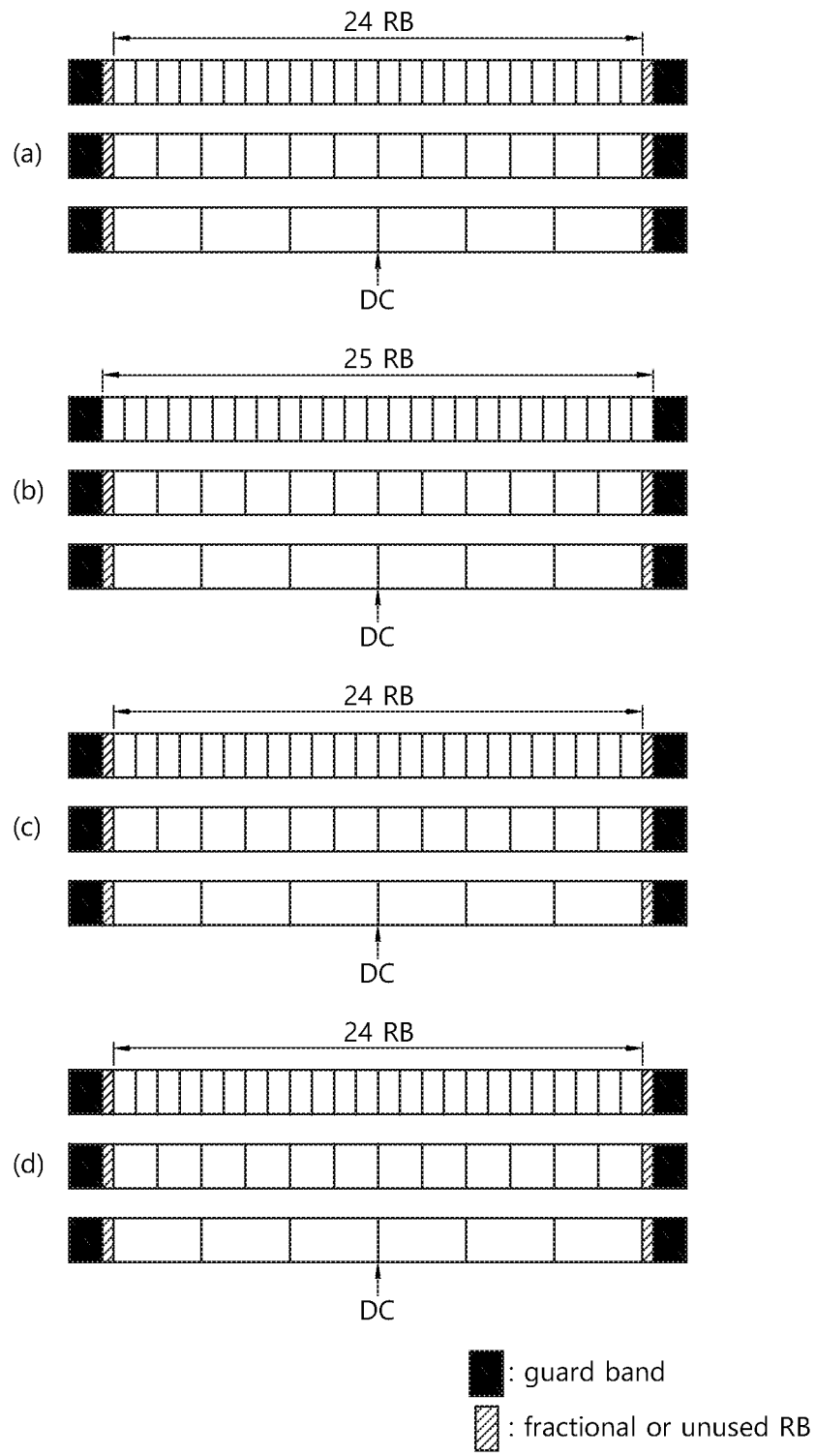
FIG. 11 shows an example of RB definition per carrier according to an embodiment of the present invention.

FIG. 11 shows an example of RB definition per carrier according to an embodiment of the present invention. FIG. 11 shows RB definition per carrier by applying the options described above, when 25 RBs are formed. FIG. 11-(a) shows RB definition per carrier with Option 1, i.e. DC subcarrier is placed at the edge of a PRB. FIG. 11-(b) shows RB definition per carrier with Option 2, i.e. DC subcarrier is placed in the middle of a PRB in the center. FIG. 11-(c) shows RB definition per carrier with Option 3, i.e. RB grid is formed based on one of the reference numerology, and DC subcarrier is placed at the edge of a PRB. FIG. 11-(d) shows RB definition per carrier with Option 4, i.e. DC subcarrier may be defined by assuming always even number of PRBs in the system bandwidth.

If a UE or the network can reduce guard band, 26 PRBs, instead of 24 PRBs, may be used for 5 MHz frequency bandwidth. In this case, system information and/or primary/secondary synchronization signal (PSS/SSS) and/or SS block may still be transmitted over 24 PRBs, but data/control may be transmitted over 26 PRBs. Regarding whether a UE or the network can utilize 26 PRBs (or, more generally +2 PRBs when odd PRBs are available assuming a certain (maximum) guard band), the capability may be indicated by explicit signaling. More generally, depending on the guard band, effective PRBs usable for DL and UL may be negotiated between the network and UEs via explicit capability signaling and configuration.

Figure 12:
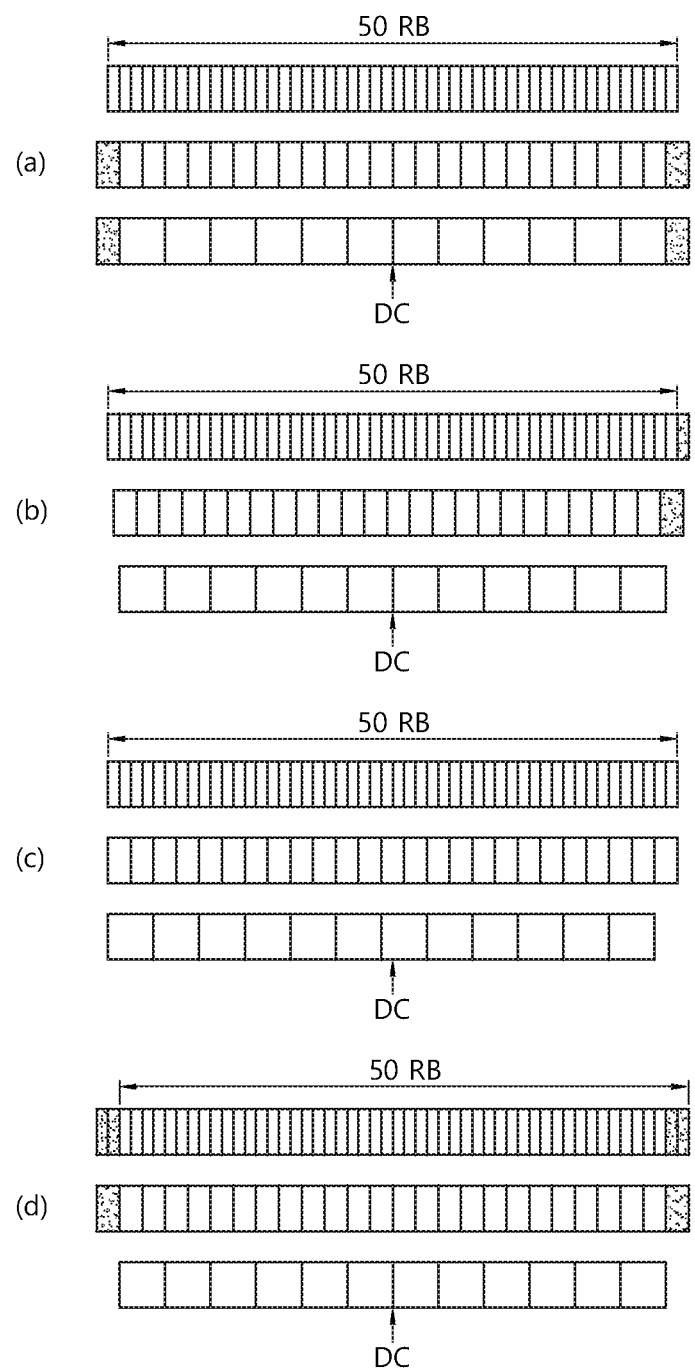
FIG. 12 shows another example of RB definition per carrier according to an embodiment of the present invention.

FIG. 12 shows another example of RB definition per carrier according to an embodiment of the present invention. FIG. 12 shows RB definition per carrier by applying the options described above, when 50 RBs are formed. FIG. 12-(a) shows RB definition per carrier with Option 1, i.e. DC subcarrier is placed at the edge of a PRB. FIG. 12-(b) shows RB definition per carrier with Option 2, i.e. DC subcarrier is placed in the middle of a PRB in the center. FIG. 12-(c) shows RB definition per carrier with Option 3, i.e. RB grid is formed based on one of the reference numerology, and DC subcarrier is placed at the edge of a PRB. FIG. 12-(d) shows RB definition per carrier with Option 4, i.e. DC subcarrier may be defined by assuming always even number of PRBs in the system bandwidth.

4. Details of Per Carrier RB Definition (2): RB Grid Starts from Edge (e.g. Lowest Frequency)

(1) Option 1: DC subcarrier may always be at the edge of a PRB. If half-subcarrier shift is not used, DC subcarrier may be the first or the last subcarrier of a PRB near the center. If half-subcarrier shift is used, DC subcarrier/subcarrier may be placed in null subcarrier between two PRBs.

(2) Option 2: When effective system bandwidth consists of odd PRBs for a given subcarrier spacing, DC subcarrier may be in the middle of a PRB in the center. That is, if half-subcarrier shift is not used, DC subcarrier may be 6th or 7th subcarrier, starting from 1st subcarrier. Though, data may be mapped to the DC subcarrier. Otherwise, DC subcarrier may be placed between 6th and 7th subcarrier of a PRB in the center. When effective system bandwidth consists of even PRBs for a given subcarrier spacing, DC subcarrier may be placed as same as Option 1 described above. In this case, DC subcarrier of different numerologies may not be aligned.

(3) Option 3: RB grid may be formed based on one of the reference numerology, numerology used for synchronization signals, 15 kHz subcarrier spacing, or numerology used for common signal such as SIB transmission. Then, RB grid of other numerology may be formed from the lowest PRBs of the reference/base numerology in a nested manner.

(4) Option 4: DC subcarrier may be defined by assuming always even number of PRBs in the system bandwidth. In other words, DC subcarrier may be placed at the edge of PRB based on the numerology which is the largest subcarrier spacing supported by the network. More particularly, to place DC subcarrier in the edge of PRBs based on the largest subcarrier spacing, regardless of subcarrier spacing, the (effective) system bandwidth may be defined as follows.

m1 PRBs for the largest subcarrier spacing m1*2 PRBs for the second largest subcarrier spacing m1*k PRBs for the smallest subcarrier spacing, where k=largest subcarrier spacing/smallest subcarrier spacing If the remaining PRBs are left, those may be used based on RF bandwidth. In other words, some RBs in different side may not be used for data transmission.

With this option, the effective bandwidth that a UE should assume may be larger than actual bandwidth. Accordingly, filtering requirement may be affected. Alternatively, smaller RF bandwidth (aligned with the effective RBs) may be used.

Generally, it is desirable that RB grid starts from the lowest PRB, and DC subcarrier is placed at the edge of PRBs to minimize misalignment. However, if RB grid starts from the lowest PRB, DC subcarrier may not be aligned if DC subcarrier is placed in the center of PRB or edge of PRB.

Figure 13:
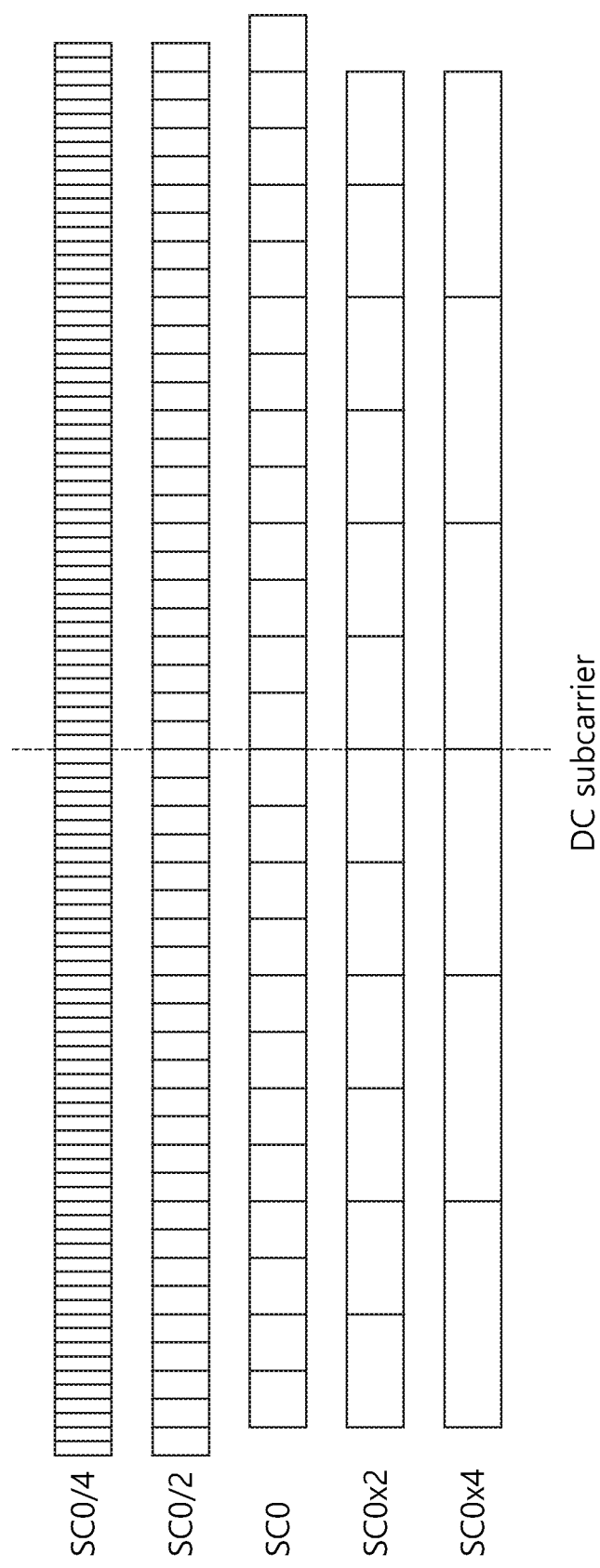
FIG. 13 shows another example of RB definition per carrier according to an embodiment of the present invention.

FIG. 13 shows another example of RB definition per carrier according to an embodiment of the present invention. To mitigate the above issue, RB grid may be started from the center for RB grid, and DC subcarrier may also be placed at the edge of PRBs. Accordingly, nested structure may be formed from the center.

5. Details of Per Carrier RB Definition (3): RB Grid Starts from Center of SS Block RB grid may start from center of SS block. As there are multiple SS blocks in a NR carrier, the gap between two SS blocks (or the gap between SS block and center of carrier) may be multiple of RB bandwidth, based on the largest subcarrier spacing supported by the network or by the frequency. Otherwise, if there are multiple SS blocks in a carrier, those may not be aligned among each other for some numerology/subcarrier spacing. PRB indexing may be based on the center frequency of the carrier, instead of based on the center of SS block, particularly when there are multiple SS blocks in the same carrier. The gap between SS block and the center of carrier may be multiple of RB bandwidth based on the largest subcarrier spacing or at least multiple of the largest subcarrier spacing. Otherwise, the position of DC subcarrier may not aligned depending on the subcarrier spacing. This approach may be used until the UE acquires information on center frequency and/or system bandwidth, or the UE is reconfigured to different frequency region other than SS block. Alternatively, the gap between two SS block may be multiple of RBs or subcarriers based on the numerology used in SS block (PSS/SSS and/or PBCH). For a case that common data such as remaining system information (RMSI) utilizes different numerology, the gap between two SS block may not be multiple of such RBs. In this case, offset may be indicated in PBCH for PRB grid of the given numerology for RMSI. For other SI or other numerology different from RMSI, offset may also be indicated in RMSI. Or, center frequency may be indicated so that global PRB grid can be formulated. The followings are examples of the offset.

If PSS/SSS numerology is 15 kHz, PBCH numerology may be 15 kHz. If RMSI numerology is 30 kHz, PRB grid for 30 kHz may have offset of 0 or 1. The offset of 0 may mean that both PRB grids are aligned at the center or from the lowest PRB.

The offset of 1 may mean that 1RB with 15 kHz is shifted.

If PSS/SSS numerology is 15 kHz, PBCH numerology may be 15 kHz. If RMSI numerology is 60 kHz, PRB grid for 60 kHz may have offset of 0, 1, 2, or 3. Shift of PRB grid of 60 kHz may depend on the offset. The offset may be also negative, so PRB grid of different numerology may be left or right shifted.

Figure 14:
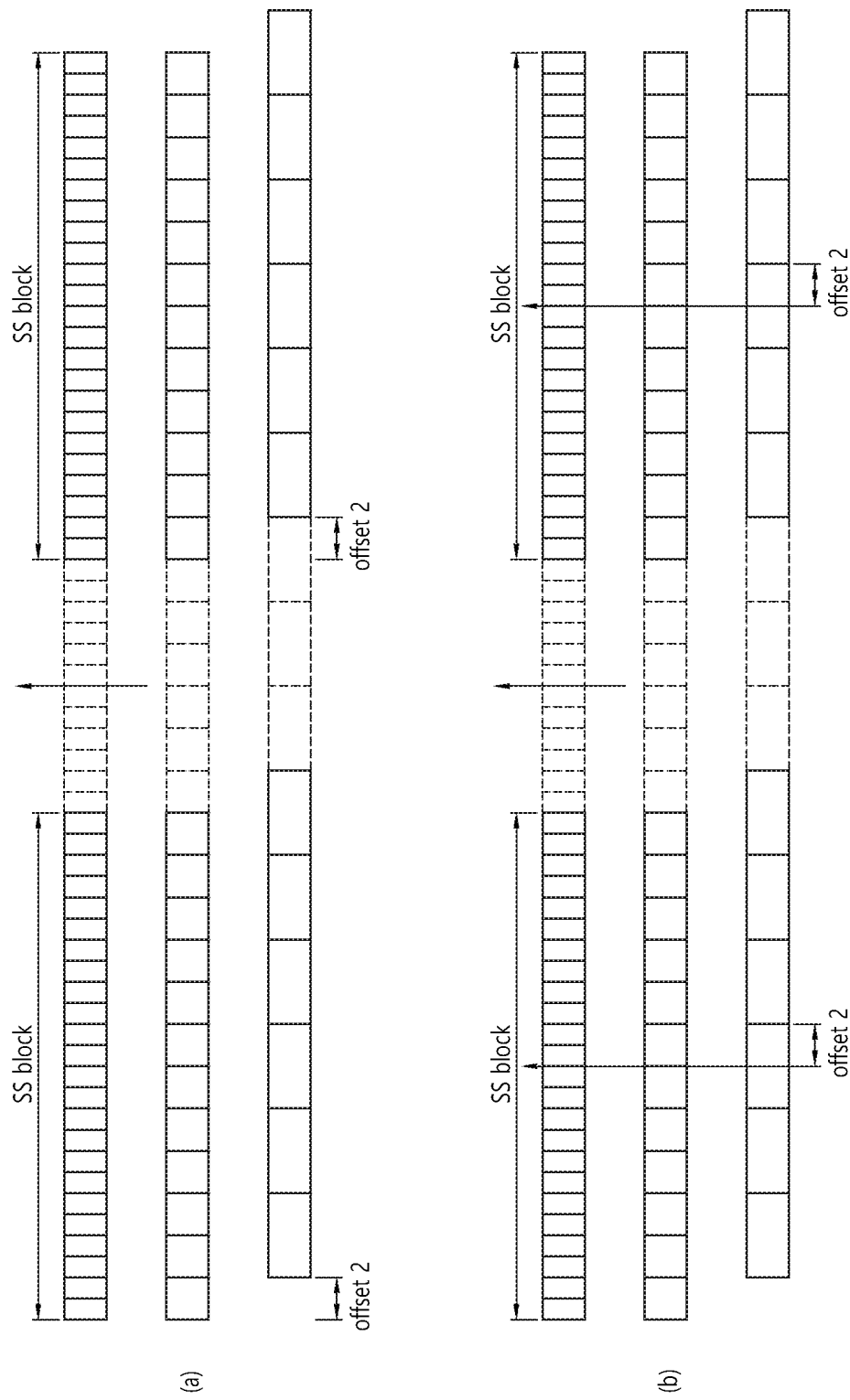
FIG. 14 shows another example of RB definition per carrier according to an embodiment of the present invention.

FIG. 14 shows another example of RB definition per carrier according to an embodiment of the present invention. FIG. 14-(a) shows a case that both PRB grids are aligned from the lowest PRB. FIG. 14-(b) shows a case that both PRB grids are aligned from the center.

For example, if bandwidth of RMSI CORESET is defined with different numerology, the center of RMSI offset and SS block may be indicated in terms of RBs based on numerology used for PBCH. The offset may have a value up to K (e.g. K=UE minimum bandwidth in RB based on PBCH numerology/2). The offset may be interpreted as the offset between center of RMSI and center of SS block, or as the offset between the lowest RB location of RMSI and the lowest RB of SS block.

Figure 15:
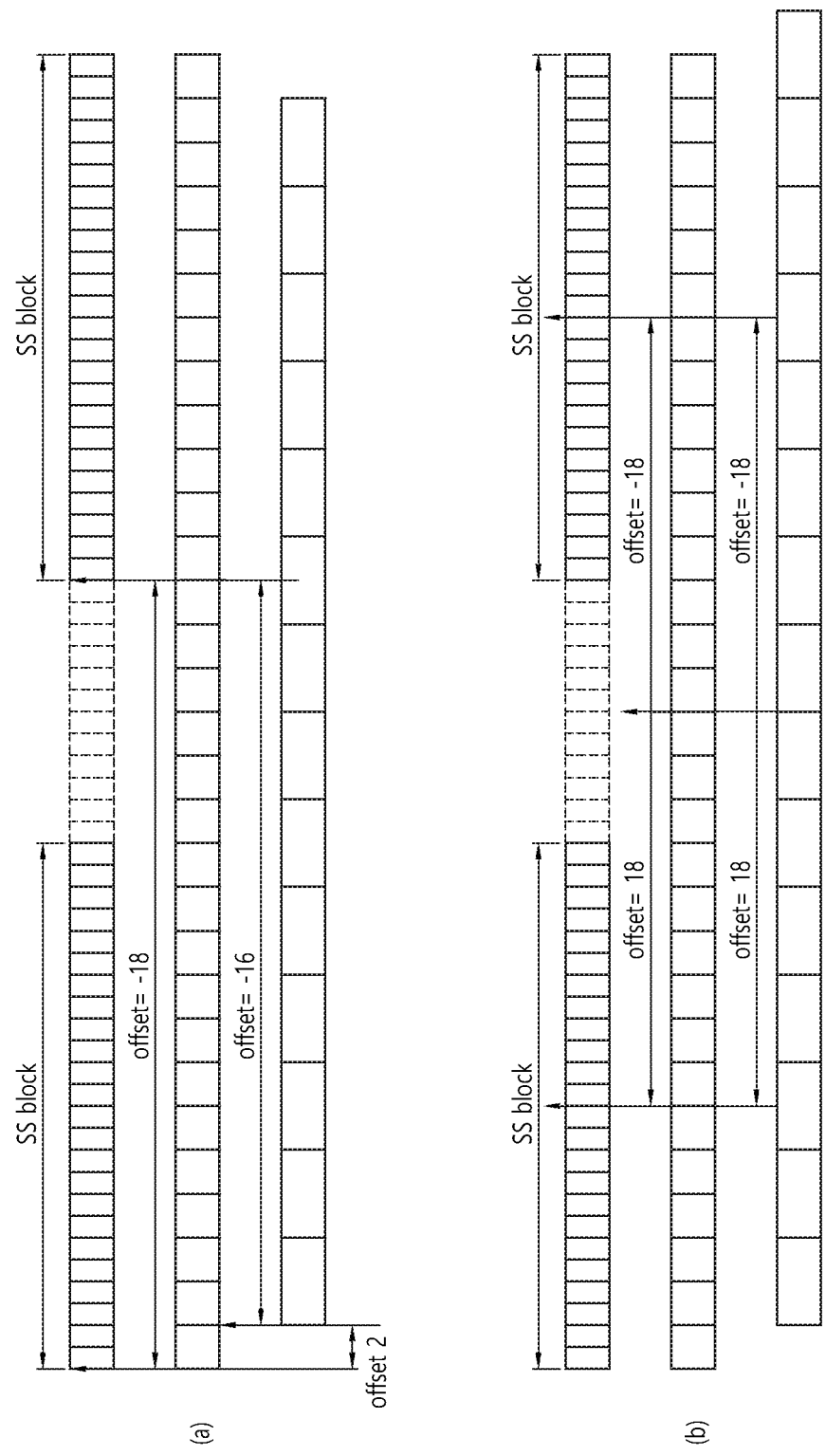
FIG. 15 shows another example of RB definition per carrier according to an embodiment of the present invention.

FIG. 15 shows another example of RB definition per carrier according to an embodiment of the present invention. FIG. 15-(a) shows a case that both PRB grids are aligned from the lowest PRB, by the offset between the lowest RB location of RMSI and the lowest RB of SS block. FIG. 15-(b) shows a case that both PRB grids are aligned from the center, by the offset between center of RMSI and center of SS block.

Similar approach may also be considered for the case that PRB are indexed from the highest frequency.

If alignment among different numerologies is considered in terms of DC subcarrier (i.e. whether DC subcarrier is subject to half-subcarrier shift or not), the effective system bandwidth may be further changed. If half-carrier shift is not used and fixed guard band is used for a given numerology, due to biased DC subcarrier from RB grid perspective, 1 subcarrier from one edge may not be used for data transmission even with fractional PRBs supported.

Figure 16:
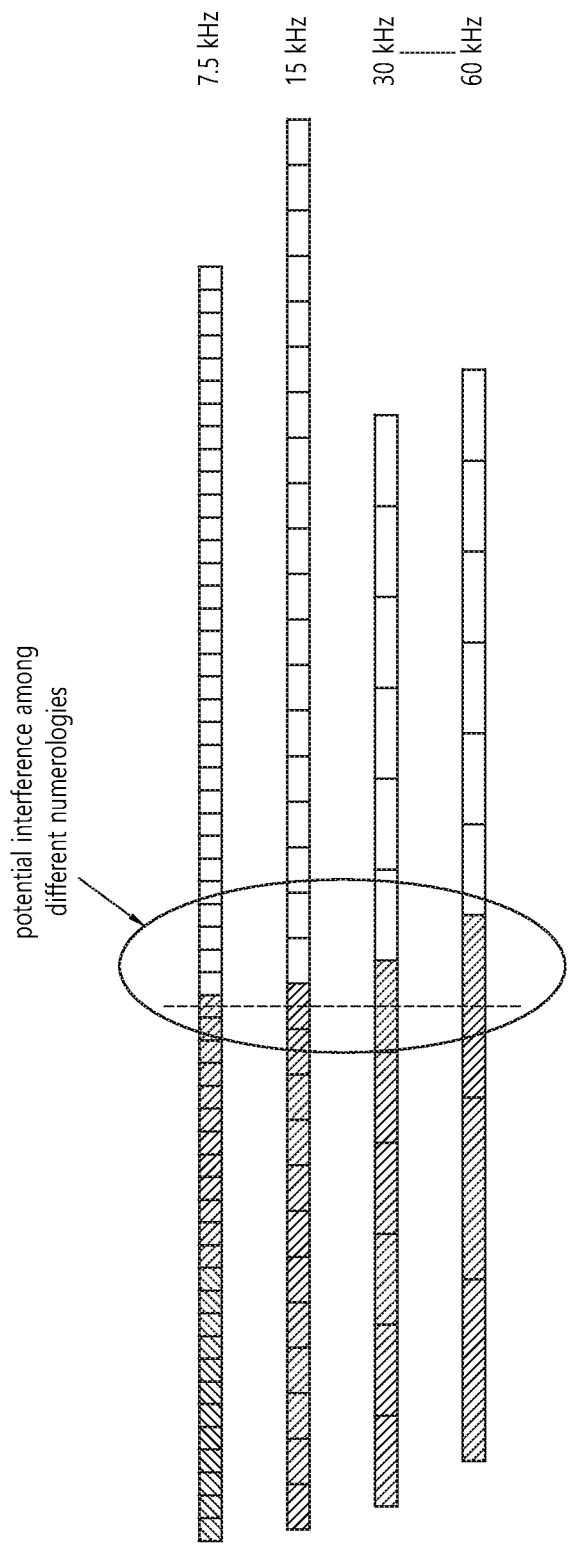
FIG. 16 shows another example of RB definition per carrier according to an embodiment of the present invention.

FIG. 16 shows another example of RB definition per carrier according to an embodiment of the present invention. FIG. 16 shows layout of subcarriers with potential DC subcarrier and RB structure if the above approach is used. In FIG. 16, if one cell uses 7.5 kHz RB on the right side of DC subcarrier whereas another cell uses 60 kHz in the left side of DC subcarrier, there are heavy interference from 7.5 kHz transmission to 60 kHz due to the overlap. To avoid this case, some gap may be necessary.

Figure 17:
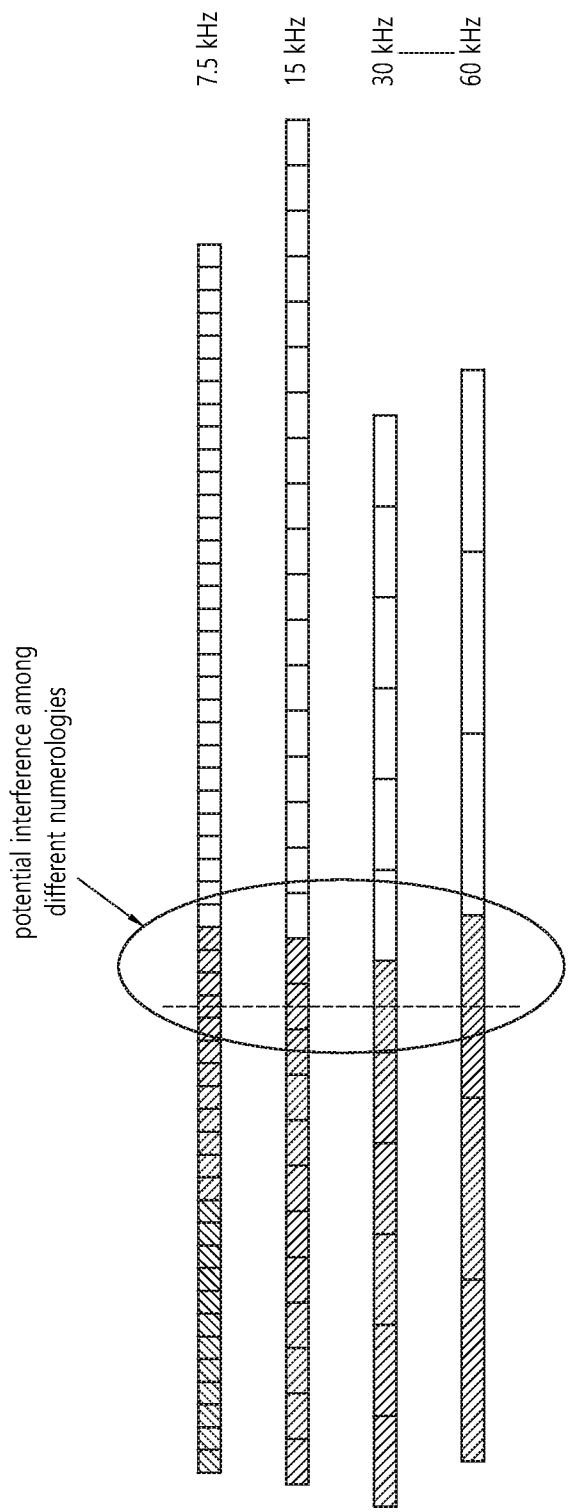
FIG. 17 shows another example of RB definition per carrier according to an embodiment of the present invention.

FIG. 17 shows another example of RB definition per carrier according to an embodiment of the present invention. Another approach is to place DC subcarrier or form a RB based on the highest subcarrier spacing or based on a reference numerology. The highest subcarrier may be defined as the largest subcarrier spacing that the network intends to utilize or defined in the specification per band or per frequency region. For example, the largest subcarrier spacing may be defined as 60 kHz for below 4 GHz, 120 kHz for below 6 GHz, 480 kHz for above 6 GHz-30 GHz. FIG. 17 shows RB layout of subcarriers and RB structure when the highest subcarrier spacing is 60 kHz, which is used in the carrier or supported by the network in a given frequency.

For the largest subcarrier spacing or reference subcarrier spacing SCr, RB grid may start from the DC subcarrier, which may be either first or last subcarrier of the RB overlapped with DC subcarrier. For a subcarrier spacing of SCr/m, DC subcarrier may be placed at the last or first subcarrier with offset of floor (m/2)-1 (or floor (m/2) depending on left or right shift) subcarrier. For example, when the largest subcarrier spacing is 60 kHz and left shift is used, for 30 kHz subcarrier spacing (i.e. m=2), the offset value may be zero. Thus, DC subcarrier may be placed at the end subcarrier of a RB. For 15 kHz subcarrier spacing, offset value may be 1. Thus, DC subcarrier may be placed at the second last subcarrier of a RB. For 7.5 kHz subcarrier spacing, the offset value may be 3. Thus, DC subcarrier may be placed at the 4th last subcarrier of a RB. Instead of DC subcarrier, center of SS block may be considered regardless of where DC subcarrier is placed. In other words, the offset between RBs may be considered as zero for the highest subcarrier spacing, and additional offset may be used for the smaller subcarrier spacing, depending on the relationship to the largest subcarrier spacing and also depending on the actual subcarrier spacing.

For subcarrier spacing of $SCr=SC0*2^r$ which is the reference subcarrier spacing or the largest subcarrier spacing supported by the network or defined in the specification, DC subcarrier for SCr may be mapped to subcarrier index 0 of a PRB, then subcarrier 0 for the largest subcarrier spacing of $SC0*2^r$ may correspond to subcarrier index of $2^k-1$ for the smaller subcarrier spacing, where $SCi=SCr*2^{-k}$.

For example, if the largest subcarrier spacing is 120 kHz, DC subcarrier for each subcarrier spacing may be as follows.
120 kHz: DC subcarrier is mapped to subcarrier index 0
60 kHz: DC subcarrier is mapped to subcarrier index 0
30 kHz: DC subcarrier is mapped to subcarrier index 1
15 kHz: DC subcarrier is mapped to subcarrier index 3
7.5 kHz: DC subcarrier is mapped to subcarrier index 7

As the offset value may be larger than 12, the offset value may need to be modulated based on 12 (i.e. subcarrier index of $(2^k-1)$ mod 12)).

For example, if the largest subcarrier spacing is 480 kHz, DC subcarrier for each subcarrier spacing may be as follows.
480 kHz: DC subcarrier is mapped to subcarrier index 0
240 kHz: DC subcarrier is mapped to subcarrier index 0
120 kHz: DC subcarrier is mapped to subcarrier index 1
60 kHz: DC subcarrier is mapped to subcarrier index 3
30 kHz: DC subcarrier is mapped to subcarrier index 7
15 kHz: DC subcarrier is mapped to subcarrier index 3
7.5 kHz: DC subcarrier is mapped to subcarrier index 7
3.75 kHz: DC subcarrier is mapped to subcarrier index 3

This maximum subcarrier spacing may be fixed in the specification per frequency band or may be configured/indicated from synchronization signals and/or PBCH/SIB.

Figure 18:
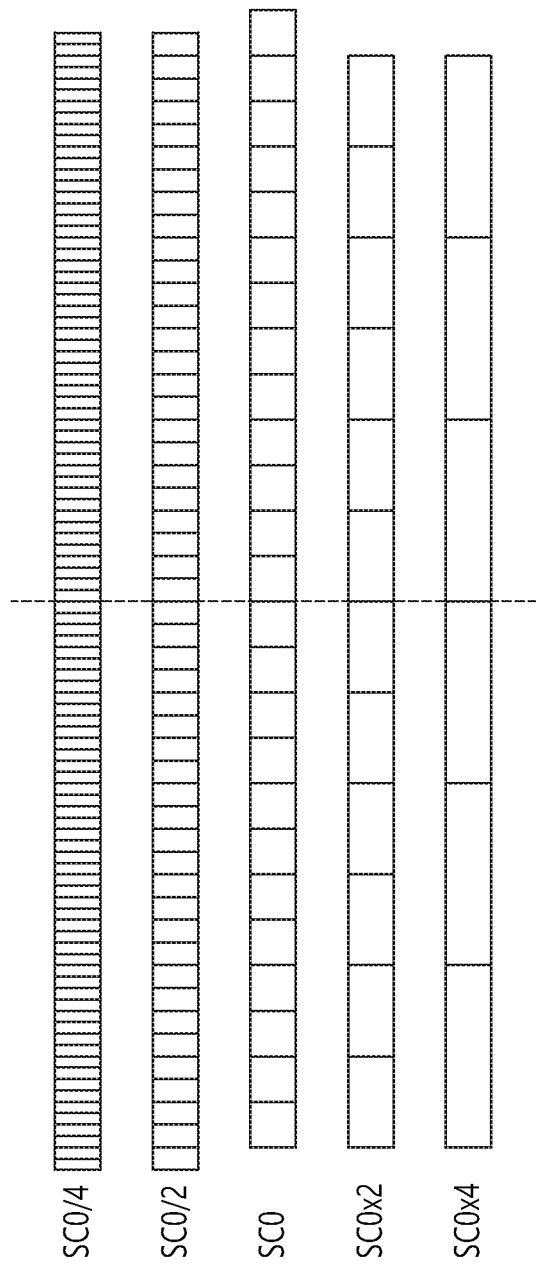
FIG. 18 shows another example of RB definition per carrier according to an embodiment of the present invention.

FIG. 18 shows another example of RB definition per carrier according to an embodiment of the present invention. FIG. 18 shows an example of RB grid where DC subcarrier is placed in different subcarrier depending on the subcarrier spacing value compared to the reference subcarrier spacing or the highest subcarrier spacing.

Alternatively, the PRB of a given numerology may be defined by the PRB based on the reference numerology (e.g. the highest subcarrier spacing supported by the network, or the smallest subcarrier spacing, or configured or fixed per frequency band as a reference numerology). In this case, RB boundary of a given numerology may be defined based on the reference RB boundary. The following shows the example.

Figure 19:
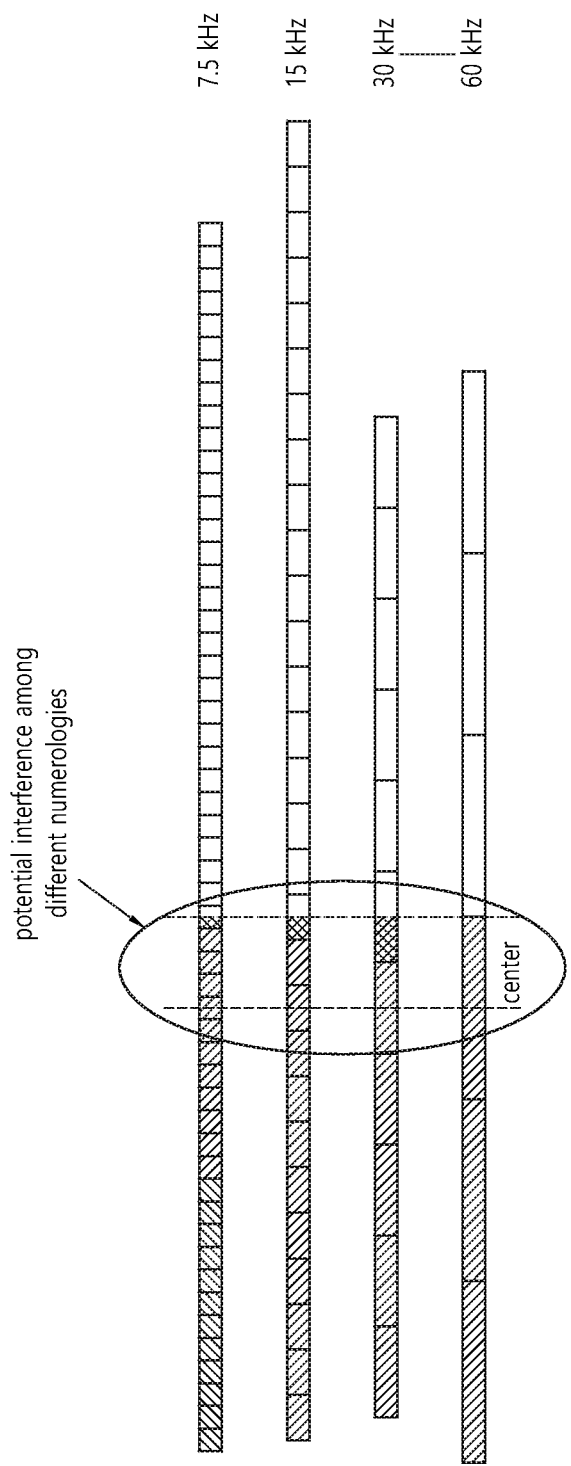
FIG. 19 shows another example of RB definition per carrier according to an embodiment of the present invention.

FIG. 19 shows another example of RB definition per carrier according to an embodiment of the present invention. In this example, subcarrier of a given numerology, which is partially or fully overlapped with the reference subcarrier spacing, is counted as RB (either for left RB or right RB). However, physical frequency of RB boundary may be determined by the reference subcarrier spacing. When a UE is scheduled with a set of RB for a given numerology, at the edge subcarrier(s), considering possible overlap with other numerology, the UE may drop one or a few number of subcarriers in the edge PRB (either or both of edge PRBs).

Or, the UE may reduce the power so that emission can be reduced. Or, the UE may apply filtering/UE-implementation technique to minimize the emission on the outside of RB frequency. For example, if the subcarrier partially overlaps or the subcarrier is not accounted as the bandwidth of RB for the given numerology, the emission should be minimized on the outside of configured RB bandwidth.

In summary, the present invention proposes the followings.

(1) A RB may be defined as [fi, fi+12*SCi]. f0 may be defined by the reference numerology where f0=F0+SCr/2 (or F0−SCr/2). F0 may be the DC frequency and f1=f0+12*SCi. This implies that a RB is defined as starting frequency and bandwidth, and counts all subcarriers within the bandwidth which are partially or fully overlapped within the bandwidth.

(2) Based on the frequency, if a UE is scheduled with a set of PRBs, at the edge of PRBs, if any subcarrier(s) are partially overlapped with the boundary of PRB edge(s), the UE may perform power drop/scaling or filtering to mitigate the interference/emission on the partially overlapped subcarriers. The network may configure whether to perform drop/power scale or perform filtering on the either or both edge of allocated PRBs. The configuration may include a set of subcarriers (i.e. number of subcarriers), whether to perform in one of edges or both edges of the allocated PRBs, etc. When a UE is scheduled with non-contiguous PRBs, the operation may occur per each PRBs which are non-contiguous, or may occur only at the boundary of the first and the last allocated PRBs. The operation may occur only at the edge of the allocated resource set configured for data monitoring. If bandwidth or data resource set is changed dynamically for bandwidth adaptation, the actual location may be changed. The indication may be indicated via dynamic or semi-static signaling. As this is for mitigating impact on interference to neighboring different numerology, the area which needs interference mitigation may be determined based on the numerology of neighbor cell or adjacent PRBs of the scheduling, assuming the same center between neighbor cells. Alternatively, center of neighbor cell(s) may also be indicated. More generally, the candidate location which needs interference mitigation may be restricted at every M PRBs, where M is SCi=SCr/M. The starting offset may be implicitly determined based on RB grid of different numerologies or explicitly indicated. In other words, interference mitigation techniques may be performed only in area overlapped with higher subcarrier spacing's PRB boundary or reference numerology's PRB boundary.

When nested approach is utilized for RB formation, the required number of subcarriers to mitigate the issue may be larger depending on the numerology used in neighbor cells' adjacent PRBs. Dynamic indication on the number of subcarriers (along with potential locations) may be used, or semi-static indication of neighbor cell's numerology (possibly along with center frequency of neighbor cell) may be used. Alternatively, frequency shift or number of subcarriers to be shifted for RB formation may also be indicated semi-statically or dynamically. For example, for each subcarrier spacing, the offset to form PRB may be indicated compared to the reference RB grid constructed based on nested approach. In other words, once RB grid is formed, at least for UE-specific scheduling, offset in terms of subcarriers may be indicated, and PRBs may be shifted based on the configured number of subcarriers.

6 Channel/Carrier Bonding (1) When Approach 1, i.e. RB definition per band, is used Depending on the channel/carrier bandwidth, the starting PRB index and ending PRB index may be changed. For example, it may be assumed that bandwidth of a band is 80 MHz and there are four carriers of 20 MHz system bandwidth which may be placed in the band. In this case, with Approach 1, RB with 15 kHz subcarrier spacing may have 0 to 399 (if guard band is not accounted for RB construction) or 439 (if guard band is accounted for RB construction). If guard band is not accounted for RB construction, when a carrier bandwidth is changed dynamically, the physical frequency where first RB can start may be changed. Thus, when this approach is used, it is desirable to form RB including guard band or it may be assumed that there is no guard band in the band.

When a carrier is defined with different system bandwidth, e.g. M1 and M2 (e.g. M1=20, M2=40) with assumption that guard band is about 10% overhead, RB formation of a carrier may follow that guard band is not accounted for RB formation, assuming semi-static guard band. For M1 and M2 bandwidth, different starting frequency for the first RB may be used. For example, in case of M1, the frequency location of a first RB (based on the RB index from the lowest frequency) may be M1*guard_band_percentage/2. In case of M2, the frequency location of a first RB may be M2*guard_band_percentage/2. In other words, the start frequency location may be changed depending on the system bandwidth or whether carrier boding is used or not.

If guard band is accounted for RB formation, RB formation may not be changed. However, the effective RBs usable for control/data may be changed. For example, if a UE needs K1 RBs with M1 system bandwidth, and K2 RBs with M2 system bandwidth, a UE may be scheduled in RBs of K1, . . . , $K_{M1}$-K1-1, where $K_{M1}$ is the number of RBs in system bandwidth of M1 if system bandwidth is M1, and K2, . . . , $K_{M2}$-K2-1 where $K_{M2}$ is the number of RBs in system bandwidth of M2 if system bandwidth is M2. By configuring effective system bandwidth for control and data (respectively or jointly), this may allow multiplexing of UEs supporting different system bandwidth (e.g. some UEs supporting only M1 and some UEs supporting M2), and UEs may be multiplexed by TDM within a subframe or across subframes.

In other words, this approach may be interpreted or understood that RB is formed without consideration of guard band, and necessary guard band may be formed by network scheduling. A UE may also assume necessary guard band based on the bandwidth where it receives/transmits control/data/signals.

(2) When Approach 2, i.e. RB definition per carrier, is used

RB formation of a carrier may follow that guard band is not accounted for RB formation, assuming semi-static guard band. For M1 and M2 bandwidth, different starting frequency for the first RB may be used. For example, in case of M1, the frequency location of a first RB (based on the RB index from the lowest frequency) may be M1*guard_band_percentage/2. In case of M2, the frequency location of a first RB may be M2*guard_band_percentage/2. In other words, the start frequency location may be changed depending on the system bandwidth or whether carrier boding is used or not.

If guard band is accounted for RB formation, RB formation may not be changed. However, the effective RBs usable for control/data may be changed. For example, if a UE needs K1 RBs with M1 system bandwidth, and K2 RBs with M2 system bandwidth, a UE may be scheduled in RBs of K1, . . . . $K_{M1}$-K1-1, where $K_{M1}$ is the number of RBs in system bandwidth of M1 if system bandwidth is M1, and K2, . . . , $K_{M2}$-K2-1 where $K_{M2}$ is the number of RBs in system bandwidth of M2 if system bandwidth is M2. By configuring effective system bandwidth for control and data (respectively or jointly), this may allow multiplexing of UEs supporting different system bandwidth (e.g. some UEs supporting only M1 and some UEs supporting M2), and UEs may be multiplexed by TDM within a subframe or across subframes.

In other words, this approach may be interpreted or understood that RB is formed without consideration of guard band, and necessary guard band may be formed by network scheduling. A UE may also assume necessary guard band based on the bandwidth where it receives/transmits control/data/signals.

To support the above approach, a carrier may be indicated with the first RB and end RB (including guard band) per numerology that the network intends to support. If carrier bonding is used, for each bonding case, the first RB and end RB may be indicated as well per numerology. As a UE system bandwidth may be smaller than the system bandwidth of a carrier or bonded carrier, a UE may also be configured with start and end RB where a UE can be scheduled with. If frequency hopping is used, the configured bandwidth may be larger than system bandwidth that a UE can support at one time. Further, a UE may be indicated with the first RB and end RB per numerology where a UE can be scheduled. In terms of common channels, signals may be transmitted only within minimum system bandwidth supported by all (at least eMBB) UEs.

When Approach 2 is used, different from Approach 1, if carrier bonding is applied, aggregation of RBs may be necessary.

(3) When Approach 4 is used, starting position or RB grid pattern may be indicated depending on whether channel bonding is used or not.

Figure 20:
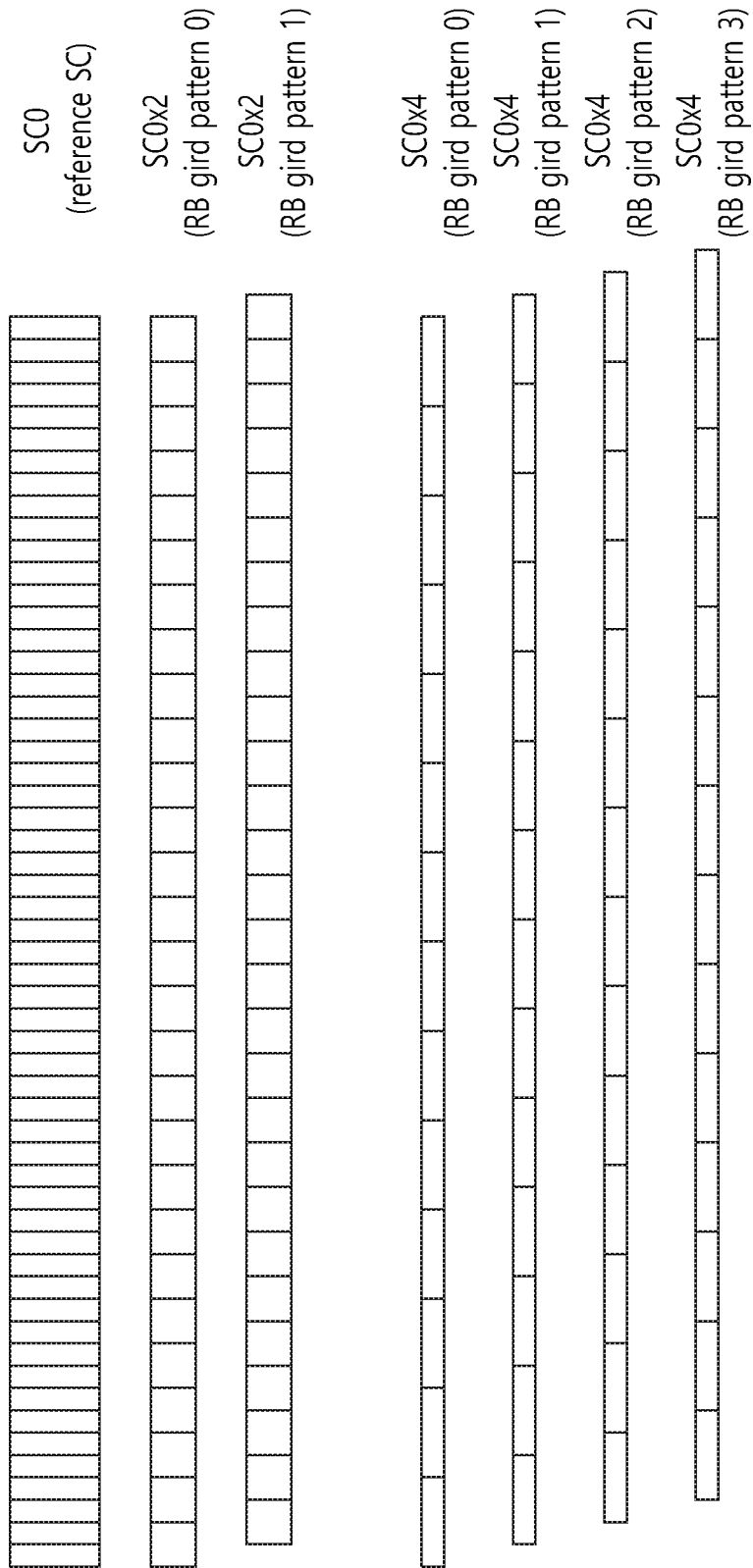
FIG. 20 shows an example of RB grid patterns according to an embodiment of the present invention.

FIG. 20 shows an example of RB grid patterns according to an embodiment of the present invention. Referring to FIG. 20, RB formation of each numerology may be based on carrier system bandwidth, and RB grid for guard band may be formed based on reference/base numerology. When guard band changes, the starting location of each numerology may change which may be indicated. Alternatively, RB grid pattern may be indicated among possible candidates.

Figure 21:
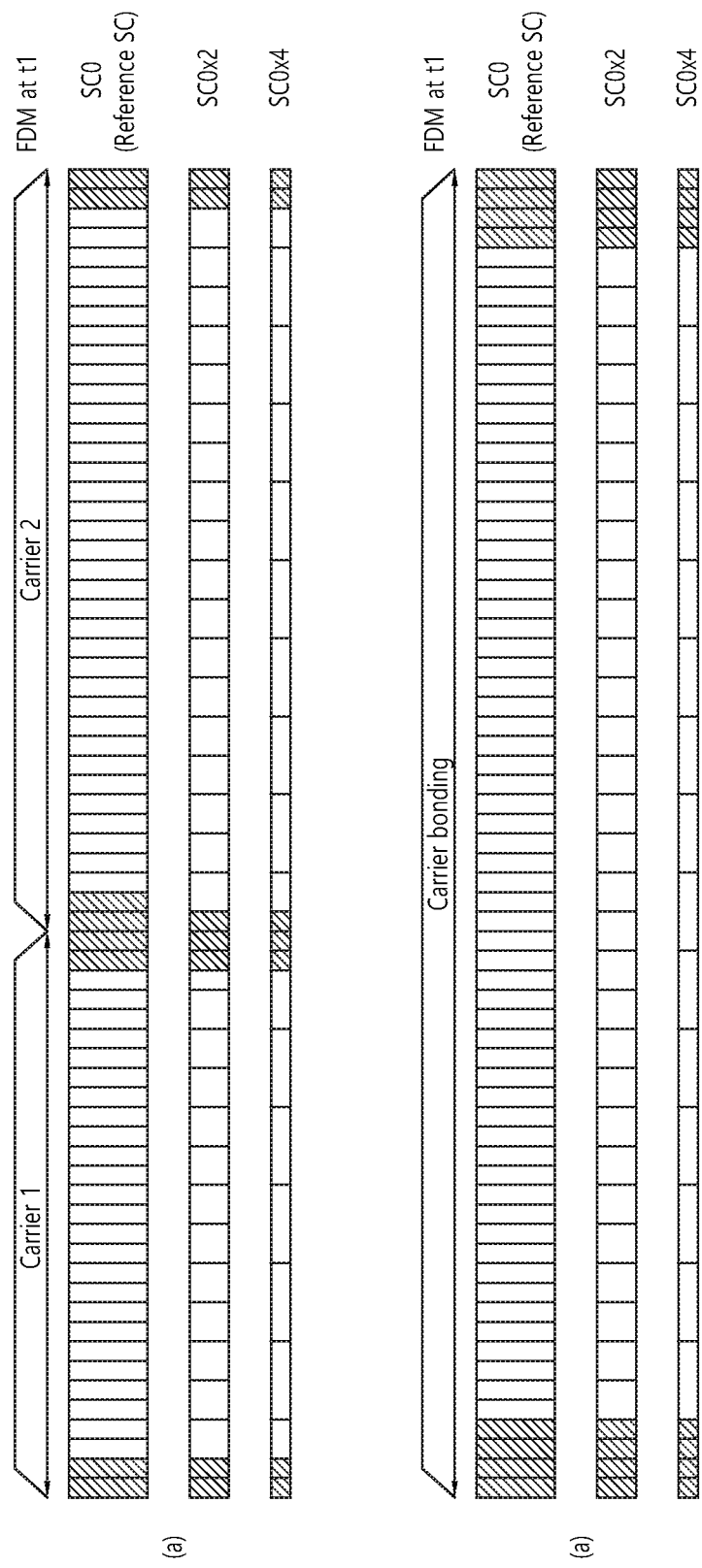
FIG. 21 shows an example of RB grid pattern shift for channel bonding according to an embodiment of the present invention.

FIG. 21 shows an example of RB grid pattern shift for channel bonding according to an embodiment of the present invention. Referring to FIG. 21, according to channel bonding. RB grid pattern is shifted for various cases, compared to FIG. 20.

Similarly, when different numerology is used per subband within a carrier, similar mechanisms can be applied. That is, RB construction may be changed considering guard band if semi-static FDM is used. Or, RB construction based on Approach 1 with including guard band may be used. Or, RB construction based on Approach 2 with including guard band may be used when TDM or dynamic FDM is used. It is also possible that similar mechanism may be applied to DL/UL FDM in the same carrier where guard band between DL and UL subband can be placed. In other words, whenever some FDM is necessary which may require guard band, the similar techniques may be applied.

When Approach 1 is used, if semi-static carrier(s) are defined in the band, RB allocation in each carrier may follow Approach 2, with or without including guard band. In other words, for UEs not supporting carrier aggregation or when carriers are semi-statically configured, both Approach 1 and 2 may be jointly used depending on UEs or scenarios.

7. Handling of Different Center Among Neighbor Cells

In NR, 100 kHz or a number which is not multiple of RB bandwidth (which may be determined based on the largest subcarrier spacing or subcarrier spacing used for synchronization signal or based on reference numerology) may be considered for carrier raster or synchronization raster. If the RB is constructed from the center of system bandwidth or center of SS block where synchronization signals are transmitted, the following issues are identified.

(1) If center of system bandwidth is used for RB construction, the center may be indicated by PBCH. Depending on the offset between the center of SS block/synchronization signals and center, RB structure for PBCH and RB structure for data/control may not be aligned. As for PBCH transmission, the RB structure or subcarrier layout needs to be occurred based on synchronization block, unless RB grids are laid out already based on the starting frequency in the frequency band. In this case, the offset between center of SS block and center of system bandwidth should be multiple of RB bandwidth depending on the subcarrier spacing based on one of the default subcarrier spacing, reference numerology, numerology used in synchronization signals, or numerology used in PBCH or numerology used in SIB. To align RB boundaries among neighbor cells, it may be necessary that the offset between the frequencies of SS block among neighbor cells should be aligned with the RB bandwidth. To support this, candidates of center for SS block or synchronization may be exchanged among neighbor cells or fixed in specification based on one of the default subcarrier spacing, reference numerology, numerology used in synchronization signals, numerology used in PBCH, or numerology used in SIB.

(2) If center of SS block is used for RB construction and different frequency of SS block can be used among neighbor cells, similar issue mentioned in (1) may occur in terms of RB alignment among neighbours. Thus, candidates of center of SS block or synchronization may be exchanged or specified in the specification, and the gap may be multiple of RB bandwidth based on one of the default subcarrier spacing, reference numerology, numerology used in synchronization signals, numerology used in PBCH, or numerology used in SIB.

Figure 22:
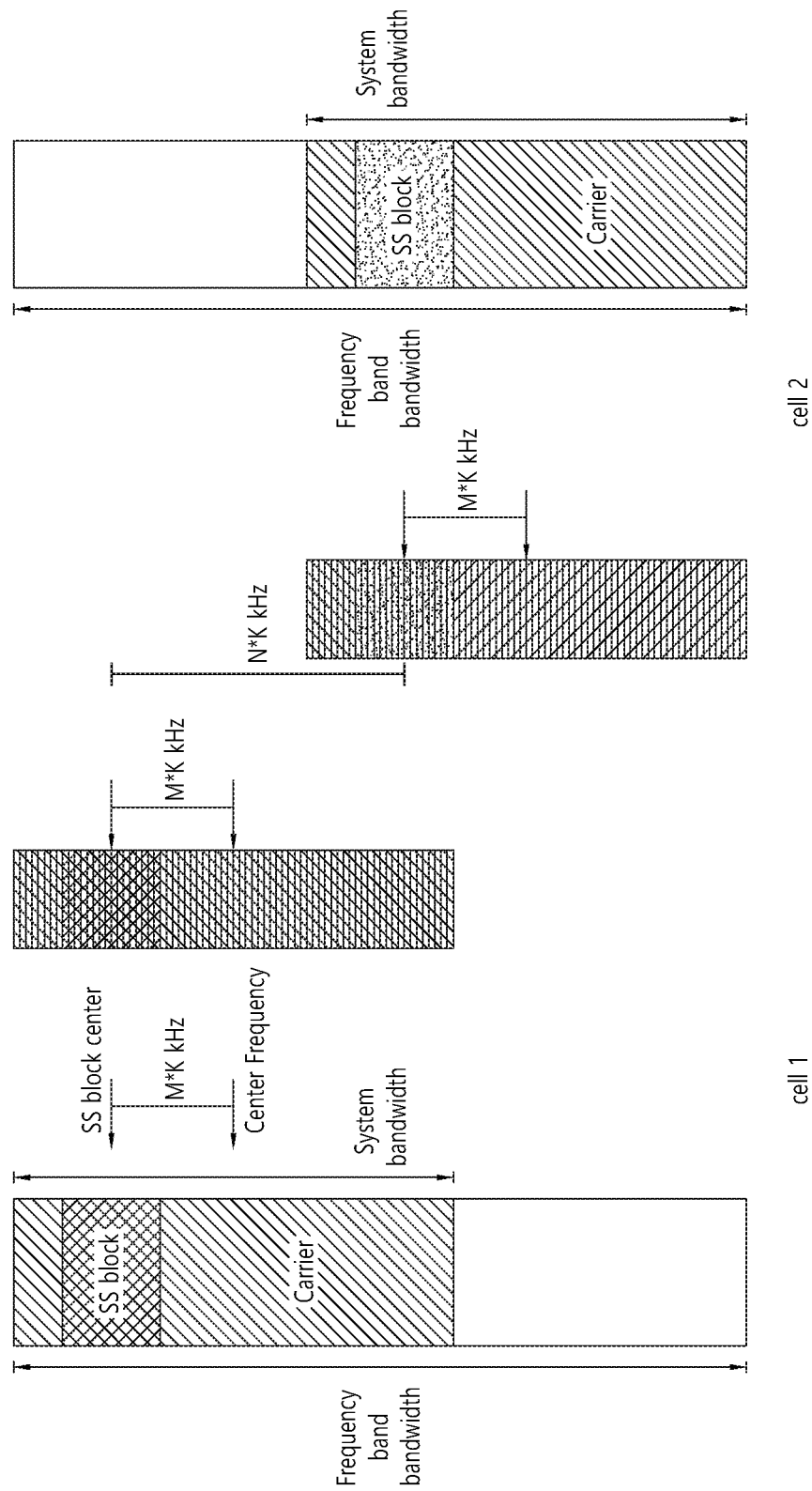
FIG. 22 shows an example of handling of different center among neighbor cells according to an embodiment of the present invention.

FIG. 22 shows an example of handling of different center among neighbor cells according to an embodiment of the present invention. Referring to FIG. 22, cell 1 and cell 2 have different center for carrier and/or SS block.

This implies that SS location may be rather limited. In this case, to address this issue, one mechanism may be to create RB structure based on starting of frequency band bandwidth so that regardless of synchronization signal, resource block for PBCH and control/data can be aligned among neighbor cells. If this is used, depending on the location of SS block, PSS/SSS may not be transmitted aligned with RB boundaries or subcarrier spacing of RB boundaries. Thus, once PSS and/or SSS are detected, a UE may need to retune to receive PBCH, as the center of PBCH and PSS/SSS is different.

Figure 23:
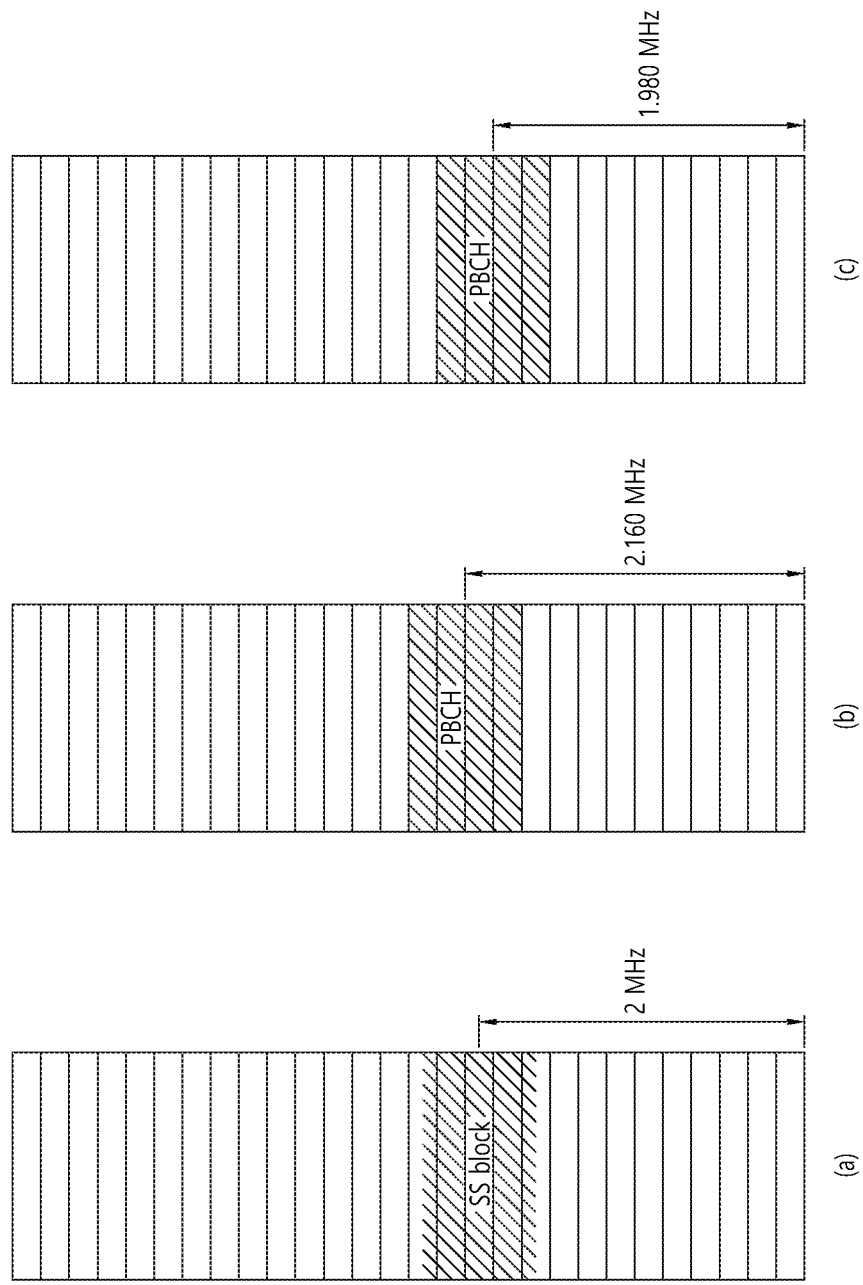
FIG. 23 shows another example of handling of different center among neighbor cells according to an embodiment of the present invention.

FIG. 23 shows another example of handling of different center among neighbor cells according to an embodiment of the present invention. FIG. 23-(a) shows that center of SS block is aligned with synchronization raster in cell 1. FIGS. 23-(b) and 23-(c) shows that center of PBCH is nearest subcarrier/RB (either higher PRB or lower PRB when not aligned) from the center of SS block or PSS/SSS in cell 2. FIG. 23-(b) shows that PBCH is rounded to the higher PRB. FIG. 23-(c) shows that PBCH is rounded to the lower PRB.

Thus, frequency offset between the center of SS block and center of PBCH (e.g. 160 kHz in case of higher PRB, −20 kHz in case of lower PRB) needs to be addressed by the UE reception. For example, the center may be returned. If different numerology is used between PSS/SSS and PBCH, resource block for PBCH may be based on the numerology used in PBCH. In this case, more offset may be necessary. Alternatively, additional gap may also be added between PSS/SSS and PBCH center, and additional gap may be specified in the specification which can be different per frequency band.

In detail, even if SS blocks center is located according to the channel raster, which may be multiple of the largest subcarrier spacing that the network intends to support (or reference numerology per frequency band or frequency range) and PSS/SSS/PBCH can be transmitted aligned with the subcarrier grid, RB structure itself may not be aligned between RB grid formed around initial SS block and RB grid formed around the center of the carrier. If RB grid is not aligned, remained subcarriers around initial SS block may not be used. In other words, when data is mapped, even though SS block contains X PRBs, to accommodate misalignment between RB grid of initial SS block and RB grid of the system bandwidth, X+1 PRB may be used for data rate matching.

Figure 24:
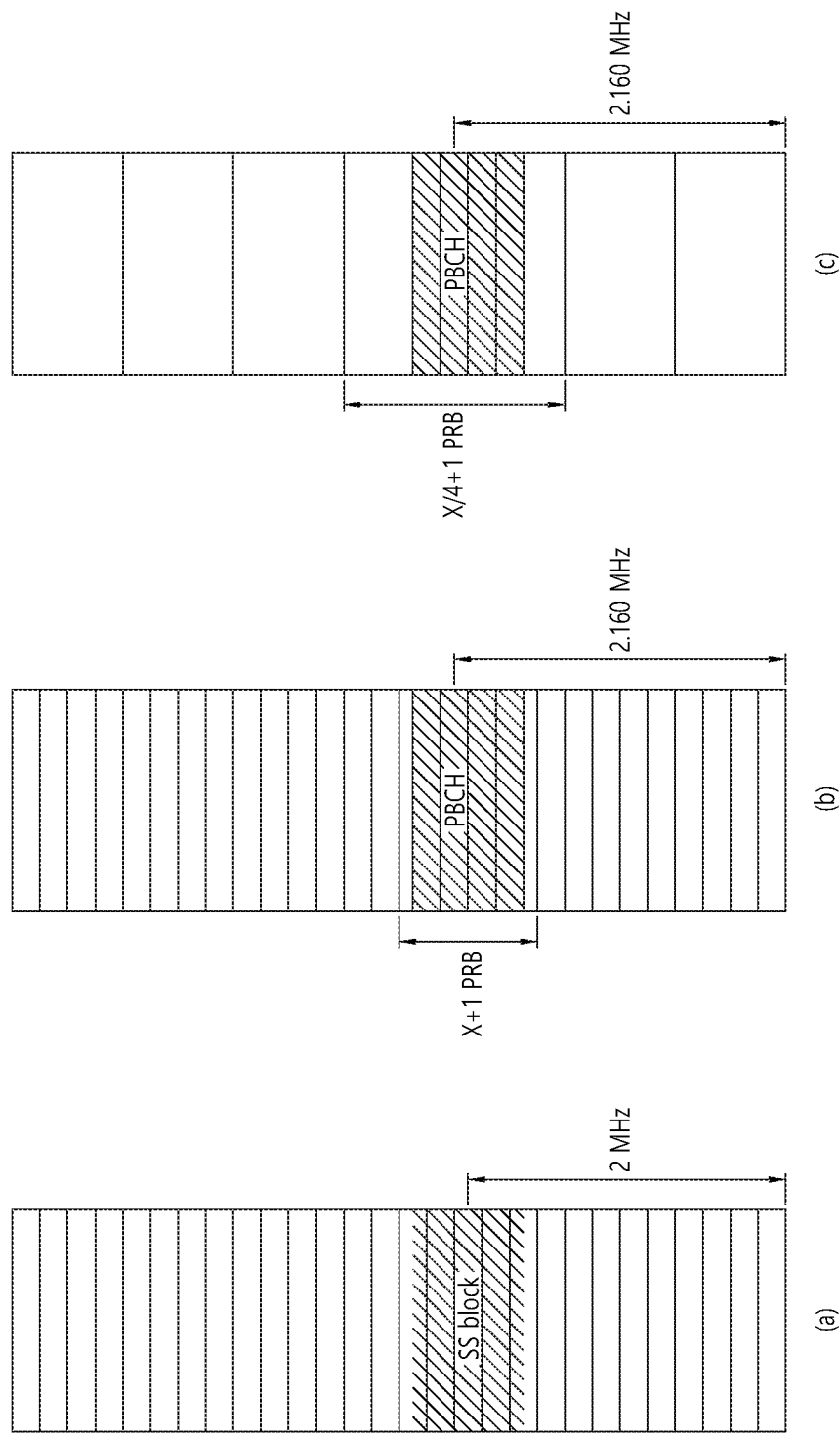
FIG. 24 shows another example of handling of different center among neighbor cells according to an embodiment of the present invention.

FIG. 24 shows another example of handling of different center among neighbor cells according to an embodiment of the present invention. In FIG. 24, it may be assumed that difference between center of SS block and center of the carrier is multiple of channel raster, but may not be multiple of RB bandwidth. In this case, a few subcarriers may be additionally wasted to accommodate misalignment. If there are multiple SS blocks in the system bandwidth to support different narrowband UEs, multiple unaligned or aligned SS block RB grid compared to the RB grid of the system bandwidth may be available. Thus, depending on the offset between center of SS block and center of carrier, a UE may use X or X+1 PRBs for data rate matching around SS block. This is shown in FIG. 24-(b).

It is also possible that different number of RBs are used for data rate matching depending on the numerology used. For example, if channel raster is formed based on 15 kHz subcarrier spacing and the used numerology is 60 kHz, and if the offset between center of the carrier and the center of the SS block is K*15 kHz, RB grid formation based on 60 kHz may be constructed from the center, assuming that center is mapped to the first subcarrier or last subcarrier of the RB in the center. Then, if K is multiple of 4*12, then RB grid of SS block and RB grid of carrier may be aligned in terms of 60 kHz. Thus, X PRB (if based on 60 kHz, or, X/4 PRBs if based on 15 kHz) may be used for data rate matching. Thus, when multiple SS blocks are present in the carrier, a UE may compute the necessary RBs for data rate matching depending on the offset between centers (between the SS block and the center of carrier) and numerology. This is shown in FIG. 24-(c).

When different RB grid is used between SS block and the carrier, the RB grid for SIB1 may depend on how SIB1 or remained essential SI is transmitted. If remained SI is transmitted at the same frequency or initial subband of SS block, it may follow RB grid of SS block. This is particularly applied when remained SI is transmitted without control channel. Otherwise, RB grid used for SIB1 may follow the RB grid formed based on the system bandwidth.

When there are multiple carriers configured to a UE and the network operates in a single wideband carrier, SS block and/or PBCH/SIB transmission may be done jointly between carriers or independently across carriers. For a UE with configured with multiple carriers in a single wideband carrier, RB grid and indexing may be shared among multiple carriers. In other words, PRB index may be based on the wideband. Alternatively, RB grid and indexing may be independently performed per carrier. In other words, PRB index may be based on each carrier.

Depending on signal or channel or where the data is scheduled, different assumption may be possible. For example, if wideband RS is configured, scrambling may be based on the wideband. Alternatively, it may be indicated to the UE whether it is based on the wideband or narrowband carrier. Also, when data is scheduled in cell-specific search space (CSS) or when control is scheduled in CSS which may be shared with wideband UEs, it may be based on the wideband carrier instead of narrowband carrier. Thus, for each configuration, it may be indicated which RB grid and/or PRB indexing should be based on. In terms of RB grid and/or PRB indexing, one of the followings may be considered.

(1) Option 1: PRB grid/indexing may be based on system bandwidth of the wideband carrier that the network operates starting from center (or from the edge).

(2) Option 2: PRB grid/indexing may be based on the carrier bandwidth of the narrow or wideband carrier that the UE is configured with as a single carrier from the center (or from the edge).

(3) Option 3: PRB grid/indexing may be based on the UE-specific bandwidth where a UE is configured to monitor or transmit.

All of the above options should allow different configuration for UL. Which mechanism is used may be determined in the specification depending on the signal or channel. For example, wideband RS in CSS space may follow Option (1), and UE-specific RS may follow Option (3). Data scheduled in CSS may follow Option (1), and data scheduled in UE-specific search space (USS) or UE-specific configuration may follow Option (3). In other words, depending on whether the signal or channel is shared with other UEs or not or shared among carriers, different mechanism may be possible. One example of PBCH is that RB grid/indexing may occur within the SS block regardless of whether SS block is configured to the UE explicitly or implicitly. In other words, if the network configures multiple SS blocks and those are informed to the UE, RB grid/indexing within each SS block may follow the RB grid/indexing within the SS block for PBCH. Alternatively, this may be applied only for SS block for initial access and other SS block may follow system bandwidth's RB grid/indexing (or carrier's RB grid/indexing).

The similar approach may also be applied to RMSI, if PRB grid of RMSI is not aligned with PRB grid of other transmission.

8. RB Grid for UL Transmission

Unless center of UL carrier is indicated, similar indication of offset (in terms of PRB grid construction) may be used based on the configured UL bandwidth, when local PRB grid. For physical random access channel (PRACH), PRB grid may be constructed based on the frequency information indicated in PRACH configuration. In other words, for each numerology, the offset of PRB grid construction locally may also be indicated for UL PRB grid construction, unless UL and DL is the same frequency.

When UL frequency or UL center frequency is indicated to a UE, the RB formation may have different option. Particularly, when a UE is configured with subband of UL spectrum, whether to define RB formation based on the subband or based on the entire system bandwidth needs to be clarified. The following options may be considered.

(1) UL RB formation may follow DL RB formation, and the centers of DL and UL may be aligned based on TX-RX frequency gap or duplex gap. If TDD or unpaired spectrum is assumed, the same UL frequency or RB grid formation of DL may be used for UL as well.

(2) UL RB formation may be based on the configured subband and the configured UE center frequency. Depending on UE configuration of UL spectrum, different UL RB grid may be constructed.

(3) UL RB grid may start from the virtual center which can be explicitly configured in MIB/SIB or UE-specific manner where RB grid is formed based on. The virtual center may be different from actual center of UL spectrum, and may have different TX-RX frequency gap than the defined value in each frequency band. When the virtual center is configured, the channel raster may support the gap between NR and LTE center being multiple of RB bandwidth (e.g. 180 kHz). The virtual center may be considered as one of candidate for DC subcarrier. In the virtual center, 7.5 kHz shift may be used for 15 kHz numerology. If the used numerology is not 15 kHz, no shift may be used.

(4) When half-subcarrier shift is used, the RB grid of UL may be different from the RB grid of DL, even in unpaired spectrum. In this case, alignment between DL and UL may not be guaranteed. In other words, when a UE is indicated with half-subcarrier shift, its RB construction may follow as if the center DC subcarrier is in null point of subcarrier, and 7.5 kHz offset may be used between DL and UL center frequency.

(5) In RB construction, any offset between DL and UL may be configured in addition to TX-RX separation gap. Based on it, RB construction, and placement of DC subcarrier may be determined.

For DL and UL, the placement of DC subcarrier (whether to half-subcarrier shifted or not) may be configured as follows.

TX-RX separation based on channel raster+offset (i.e. shift)

TX-RX separation based on channel raster allows offset (in this case, no shift may be handled)

Figure 25:
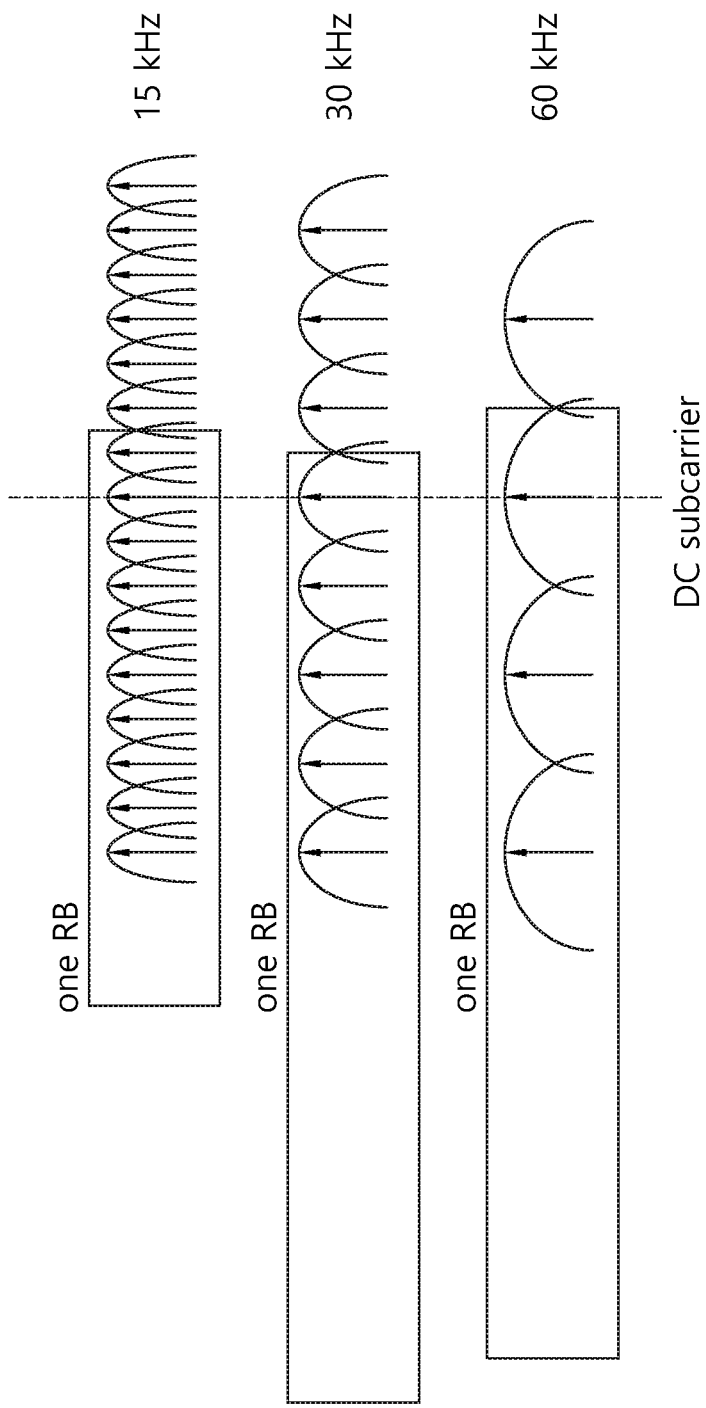
FIG. 25 shows an example of UL RB grid according to an embodiment of the present invention.

FIG. 25 shows an example of UL RB grid according to an embodiment of the present invention. Referring to FIG. 25, reference numerology used for shift may also be configurable. RB structure among different numerology may be defined based on the offset. FIG. 25 shows subcarrier mapping when the offset is zero.

Figure 26:
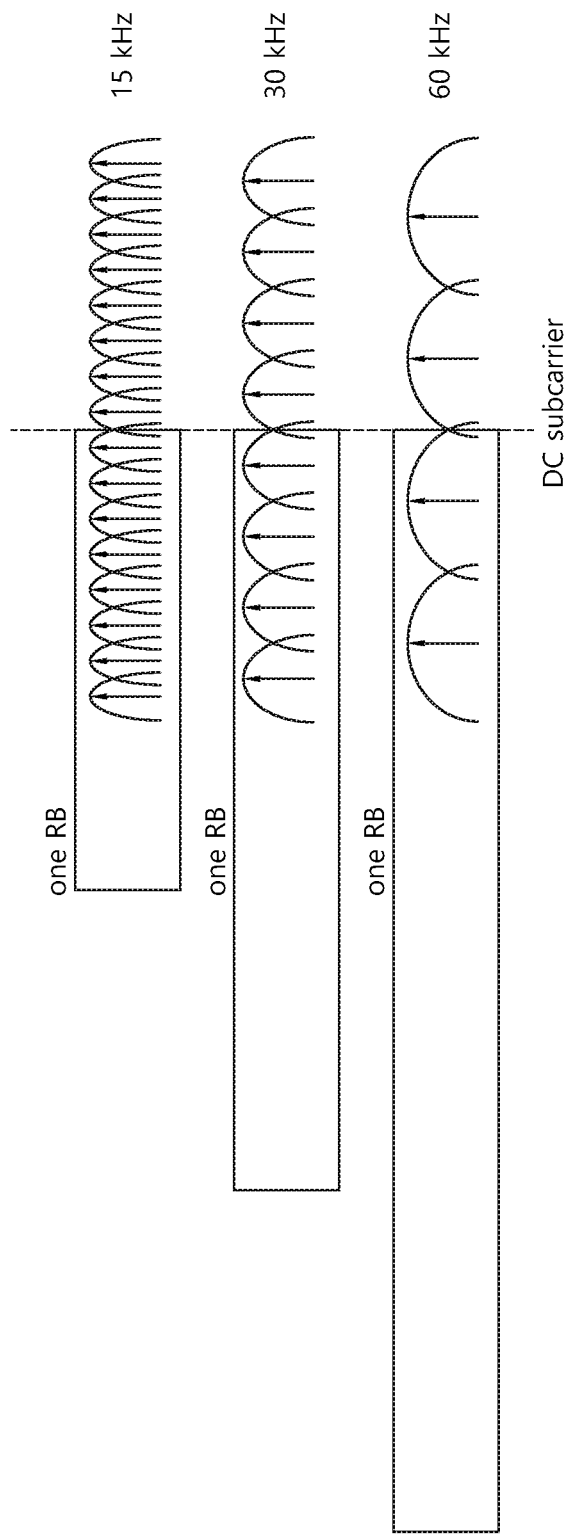
FIG. 26 shows another example of UL RB grid according to an embodiment of the present invention.

FIG. 26 shows another example of UL RB grid according to an embodiment of the present invention. Referring to FIG. 26, when offset is applied, the issue with DC subcarrier, which requires different shift value for each numerology, may be raised. In this case, a UE cannot be configured with shift if there are more than one numerology is used in the spectrum. To put DC subcarrier without any shift, DC subcarrier may be assumed differently per numerology. Or, center frequency of DC subcarrier may be determined independently per numerology or with offset value.

9. Wideband Handling

If the center of band is not aligned with PRB indexing, the offset between PRB edge subcarrier (either 0 or 11 depending on how PRBs are formed) and the center of band may be indicated. This indication may be necessary only if channel raster or synchronization raster is not multiple of resource block bandwidth. The value may be a few values depending on the synchronization/channel raster. If the channel raster is 100 kHz, depending on the numerology used for PRB indexing, different set of values may be possible. Thus, a set of values may be defined per band, and the numerology used for RMSI may be prefixed. Or, depending on the numerology used for RMSI, the set may be different. As a NR carrier may occupy only part of a band, the maximum RB number may be much smaller than the size of band in terms of PRBs. In this sense, at least for the case of RS generation, the sequence length and starting offset to be applied to the sequence may be configured so that sequence appropriate for the NR carrier bandwidth can be supported.

If this approach is used, it is possible that different band may overlap in the frequency partially or fully between different releases. For example, in 3GPP Rel-15, frequency range from 3.5 GHz-3.8 GHz may be defined as band A, but in 3GPP Rel-16, frequency range 3.4 GHz-3.9 GHz may be defined as band B. A Rel-15 UE may create RS/PRB indexing based on band A information, whereas a Rel-16 UE may create RS/PRB indexing based on band B information. Thus, when bands are overlapped in frequency between different releases, the overlapped portion should be backward compatible. To support this, the PRB indexing/RS sequence may be generated in band A, and then separate PRB indexing may be performed for the frequency region outside of band A. One simple approach to support this may be to use band A's center as band B's center (regardless of actual center frequency of band B), and PRB indexing/RS sequence generation may be based on the center of band A. Then, only different number of maximum RBs may be configured to Rel-15 and Rel-16 UEs.

Figure 27:
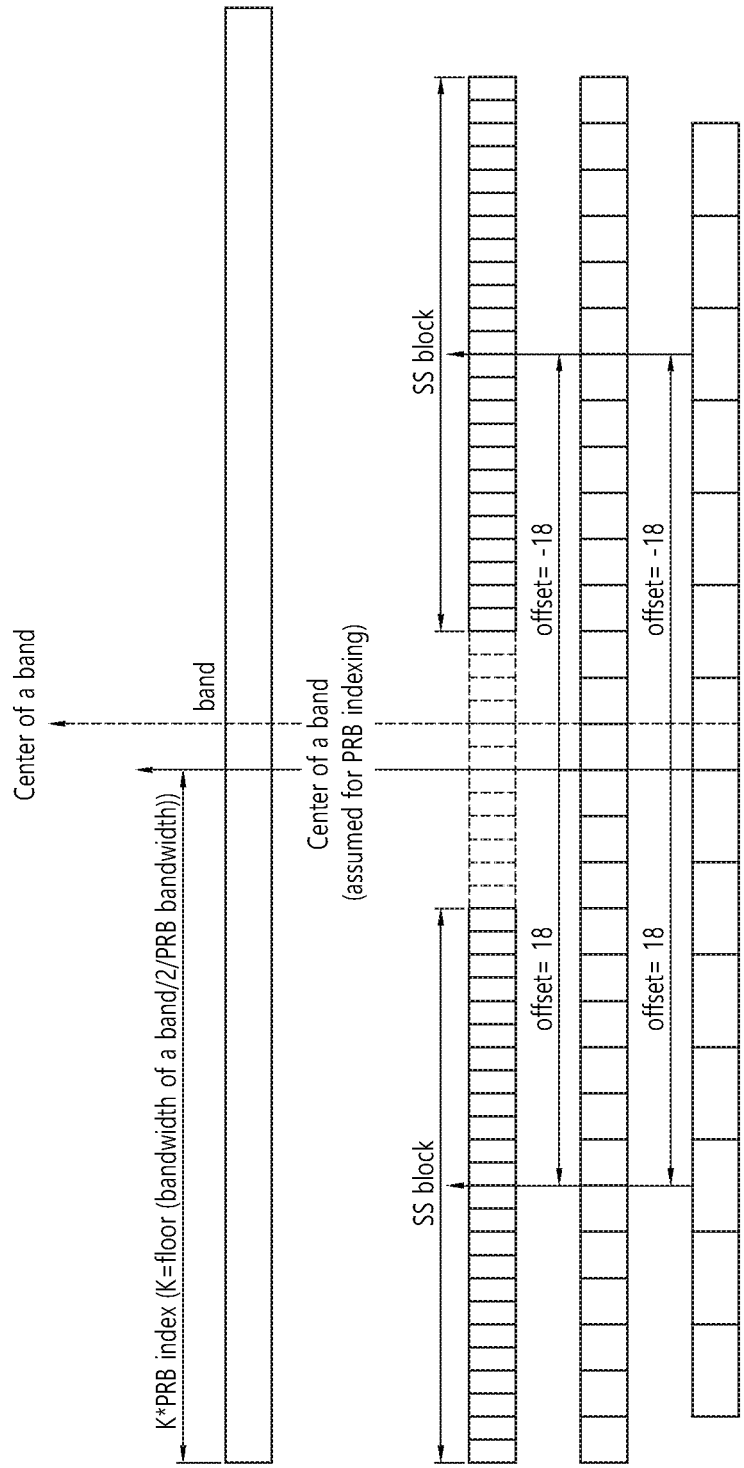
FIG. 27 shows an example of PRB index in a wideband according to an embodiment of the present invention.

FIG. 27 shows an example of PRB index in a wideband according to an embodiment of the present invention. A UE searches SS block based on synchronization/channel raster. If synchronization/channel raster is multiple of RB bandwidth based on numerology used in SS block, PRB indexing for RMSI may be indicated with offset, if RMSI numerology is different from numerology of SS block (RMSI subcarrier spacing is larger than that of SS block). If the numerology is same or RMSI's subcarrier spacing is smaller than that of SS block, offset is not necessary. PRB indexing of the given numerology may be created based on SS block. In this case, the center of band or carrier may be in the synchronization/channel raster. Thus, depending on the bandwidth of the band, the center may not be exactly center. In other words, the center location may be floor or ceil of (bandwidth of a band/RB bandwidth/2)*RB bandwidth. In other words, near the half of the bandwidth aligned with PRB indexing based on synchronization/channel raster may be center of band. Alternatively, as mentioned earlier, the residual offset between center of band, and center of SS block may be indicated (i.e. K=mod (bandwidth of a band/2, PRB bandwidth)). In this case, center of a band may be bandwidth of a band/2-K.

Figure 28:
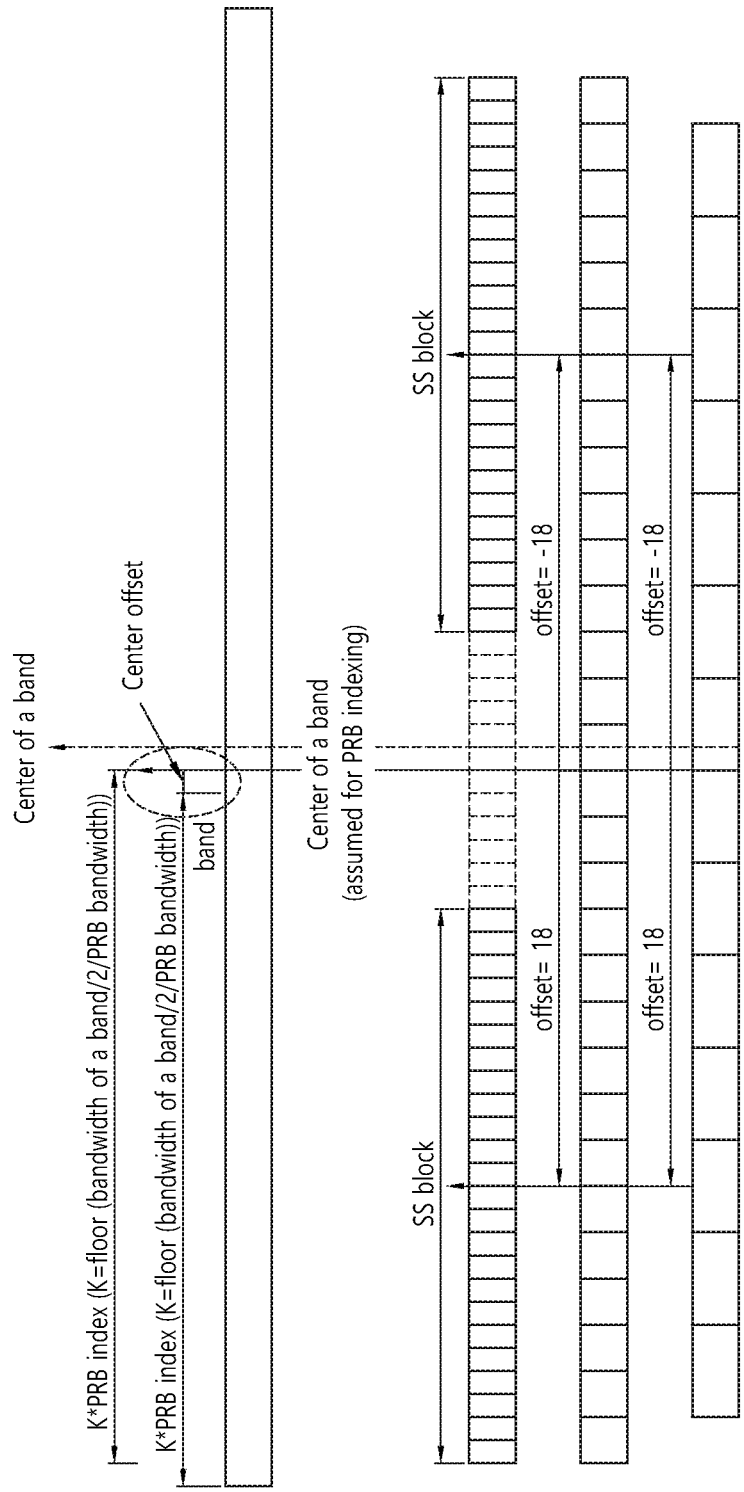
FIG. 28 shows another example of PRB index in a wideband according to an embodiment of the present invention.

FIG. 28 shows another example of PRB index in a wideband according to an embodiment of the present invention. A UE searches SS block based on synchronization/channel raster. If synchronization/channel raster is not multiple RB bandwidth based on numerology used in SS block, the offset which needs to be added to the center of a band may be (floor (bandwidth of a band/2/PRB index)*PRB index). In other words, the center of a band (for PRB indexing) may be offset+floor (bandwidth of a band/2/PRB index)*PRB index. This is based on the assumption that PRB grid is aligned with center of SS block. In this case, the center of a band may be 'bandwidth of a band/2-K+start frequency of a band'.

In either case, if the center of band is used as a reference point for global PRB indexing, PRB indexing may occur around center of band. The maximum PRB size may be ceil (bandwidth of a band/PRB bandwidth). Indexing may start from the lowest frequency in the band.

This may be called a virtual center. Depending on the synchronization/channel raster, the offset to compute virtual center may or may not be indicated. In terms of PRB indexing, instead of depending on the numerology used in SS block, numerology used in RMSI may also be used. The center of SS block or center of RMSI bandwidth may be used as a PRB grid reference, whereas the reference for global PRB indexing may be computed as mentioned above. The gap between a reference of PRB grid and the reference of PRB indexing may always be multiple of RB bandwidth based on the numerology used for SS block or RMSI (depending on which one is used).

This approach is same as Approach 1 described above, i.e. RB definition per band. Only addition is that a UE may be potentially indicated with center offset if synchronization/channel raster is not multiple of PRB bandwidth. And, also, the reference numerology used for PRB indexing may be clarified (either SS block or RMSI numerology).

Figure 29:
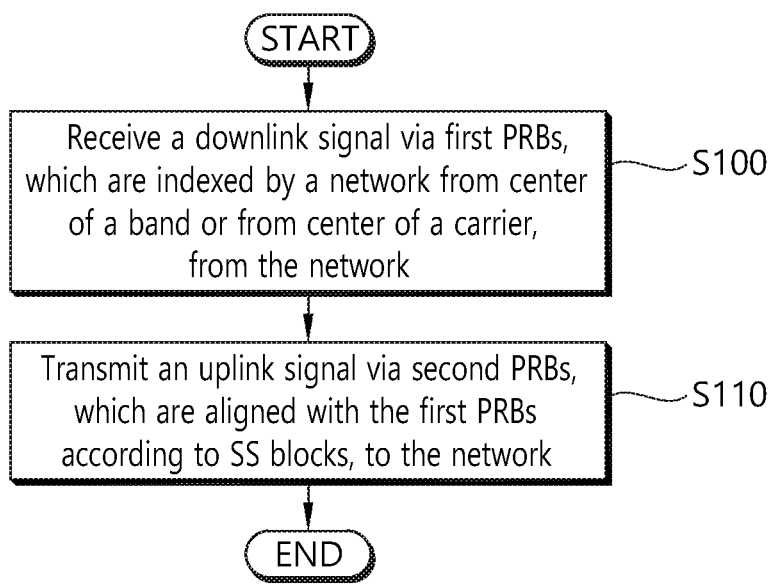
FIG. 29 shows a method for forming a RB structure by a UE according to an embodiment of the present invention.

FIG. 29 shows a method for forming a RB structure by a UE according to an embodiment of the present invention. The present invention described above may be applied to this embodiment.

In step S100, the UE receives a DL signal via first PRBs, which are indexed by a network from a center of a band or from a center of a carrier, from the network. The band may be partitioned into a plurality of carriers, and each of the plurality of carriers may have a maximum system bandwidth. Or, the band may be partitioned into a plurality of channels, and each of the plurality of channels may have the same bandwidth. The channel may be defined as a minimum resource block that the network intends to support based on a largest subcarrier spacing that the network can support. The first PRBs may be indexed per numerology. Further, the first PRBs may be indexed by including or excluding a guard band. A bandwidth of the carrier may be represented as a size of resource block multiplied by N, and the size of resource block may be determined based on one of a reference subcarrier spacing, a largest subcarrier spacing, or a smallest subcarrier spacing, that the network intends to support. A direct current (DC) subcarrier may be placed at edge of the first PRBs based on a largest subcarrier spacing supported by the network.

In step S110, the UE transmits a UL signal via second PRBs, which are aligned with the first PRBs according to SS blocks, to the network. An offset may be indicated in the SS blocks for RMSI, which uses different numerology from the SS blocks. The second PRBs may be aligned with the first PRBS according to shift by the offset. The offset may correspond to an offset between the center of the carrier and a center of the SS blocks. Or, the offset may correspond to an offset between a lowest RB location of the RMSI and a lowest RB location of the SS blocks.

Figure 30:
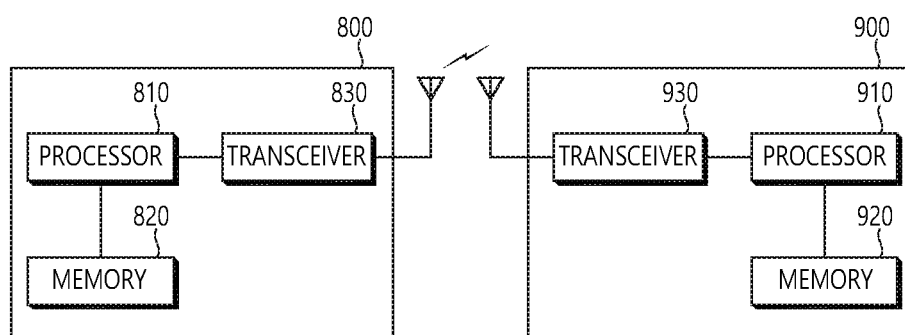
FIG. 30 shows a wireless communication system to implement an embodiment of the present invention.

FIG. 30 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for forming a resource block (RB) structure by a user equipment (UE) in a wireless communication system, the method comprising:

receiving a downlink (DL) signal via first physical resource blocks (PRBs), which are indexed by a network from a center of a band or from a center of a carrier, from the network; and transmitting an uplink (UL) signal via second PRBs, which are aligned with the first PRBs according to synchronization signal (SS) blocks, to the network, wherein an offset is indicated in the SS blocks for remaining system information (RMSI), which uses different numerology from the SS blocks.

2. The method of claim 1, wherein the band is partitioned into a plurality of carriers, and wherein each of the plurality of carriers has a maximum system bandwidth.

3. The method of claim 1, wherein the band is partitioned into a plurality of channels having a same bandwidth.

4. The method of claim 1, wherein each of the plurality of channels is defined as a minimum resource block that the network intends to support based on a largest subcarrier spacing that the network can support.

5. The method of claim 1, wherein the first PRBs are indexed per numerology.

6. The method of claim 1, wherein the first PRBs are indexed by including or excluding a guard band.

7. The method of claim 1, wherein a bandwidth of the carrier is represented as a size of resource block multiplied by N, and wherein the size of resource block is determined based on one of a reference subcarrier spacing, a largest subcarrier spacing, or a smallest subcarrier spacing, that the network intends to support.

8. The method of claim 1, wherein a direct current (DC) subcarrier is placed at edge of the first PRBs based on a largest subcarrier spacing supported by the network.

9. The method of claim 1, wherein the second PRBs are aligned with the first PRBs according to shift by the offset.

10. The method of claim 1, wherein the offset corresponds to an offset between the center of the carrier and a center of the SS blocks.

11. The method of claim 1, wherein the offset corresponds to an offset between a lowest RB location of the RMSI and a lowest RB location of the SS blocks.

12. A user equipment (UE) in a wireless communication system, the UE comprising:

a memory;

a transceiver; and a processor, coupled to the memory and the transceiver, that:

controls the transceiver to receive a downlink (DL) signal via first physical resource blocks (PRBs), which are indexed by a network from a center of a band or from a center of a carrier, from the network, and controls the transceiver to transmit an uplink (UL) signal via second PRBs, which are aligned with the first PRBs according to synchronization signal (SS) blocks, to the network, wherein an offset is indicated in the SS blocks for remaining system information (RMSI), which uses different numerology from the SS blocks.

* * * * *